(12) United States Patent
Thomas et al.

(10) Patent No.: US 10,954,880 B1
(45) Date of Patent: Mar. 23, 2021

(54) SYSTEMS AND METHODS FOR INFERERING FUEL INJECTION PRESSURE AND USES THEREOF

(71) Applicant: Ford Global Technologies, LLC, Dearborn, MI (US)

(72) Inventors: Joseph Lyle Thomas, Farmington Hills, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/686,513

(22) Filed: Nov. 18, 2019

(51) Int. Cl.
| | | |
|---|---|---|
| *F02D 41/40* | (2006.01) | |
| *F02M 69/46* | (2006.01) | |
| *F02D 41/22* | (2006.01) | |
| *B60K 15/03* | (2006.01) | |
| *F02D 41/34* | (2006.01) | |
| *F02M 61/08* | (2006.01) | |

(52) U.S. Cl.
CPC ............ *F02D 41/401* (2013.01); *B60K 15/03* (2013.01); *F02D 41/222* (2013.01); *F02D 41/345* (2013.01); *F02M 61/08* (2013.01); *F02M 69/465* (2013.01); *B60K 2015/03243* (2013.01); *F02D 2200/0604* (2013.01); *F02D 2200/0618* (2013.01)

(58) Field of Classification Search
CPC ...... F02D 41/40; F02D 41/401; F02D 41/222; F02D 41/345; F02D 2200/0604; F02D 2200/0618; F02M 61/08; F02M 69/465; B60K 15/03; B60K 2015/03243
See application file for complete search history.

(56) References Cited

U.S. PATENT DOCUMENTS

| | | | |
|---|---|---|---|
| 7,558,665 B1 * | 7/2009 | Geveci | F02D 41/2438 701/104 |
| 7,640,916 B2 | 1/2010 | Ulrey et al. | |
| 7,991,538 B2 | 8/2011 | Olbrich et al. | |
| 9,334,824 B2 | 5/2016 | Pursifull et al. | |
| 10,094,319 B2 | 10/2018 | Ulrey et al. | |
| 10,760,518 B2 * | 9/2020 | Pursifull | F02D 41/2432 |

FOREIGN PATENT DOCUMENTS

CN     1227455 A    9/1999

* cited by examiner

*Primary Examiner* — Hieu T Vo
(74) *Attorney, Agent, or Firm* — Geoffrey Brumbaugh; McCoy Russell LLP

(57) ABSTRACT

Methods and systems are provided for controlling fuel injection to cylinders of an engine in a vehicle. In one example, a method comprises monitoring an electrical energy profile associated with a fuel injector that has been commanded to inject a predetermined amount of a fuel into an engine cylinder, inferring a fuel injection pressure based on the electrical energy profile, and controlling a subsequent fuel injection based on the inferred fuel injection pressure. In this way, fuel injection may be controlled without relying on a pressure sensor in a fuel rail that supplies fuel to the fuel injector, under conditions where the fuel rail does not include the pressure sensor or where the pressure sensor is degraded.

20 Claims, 15 Drawing Sheets

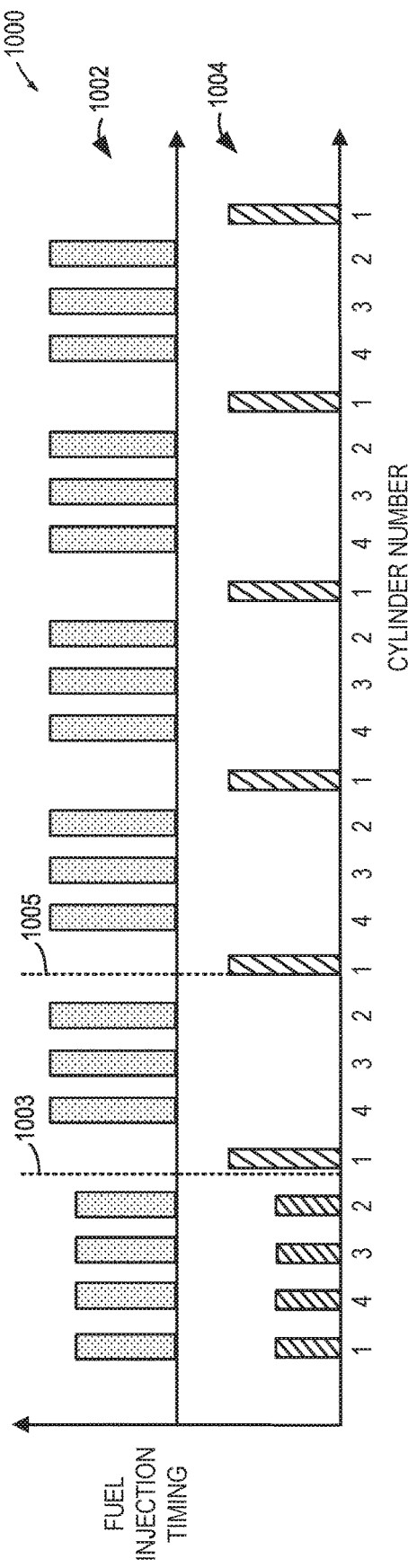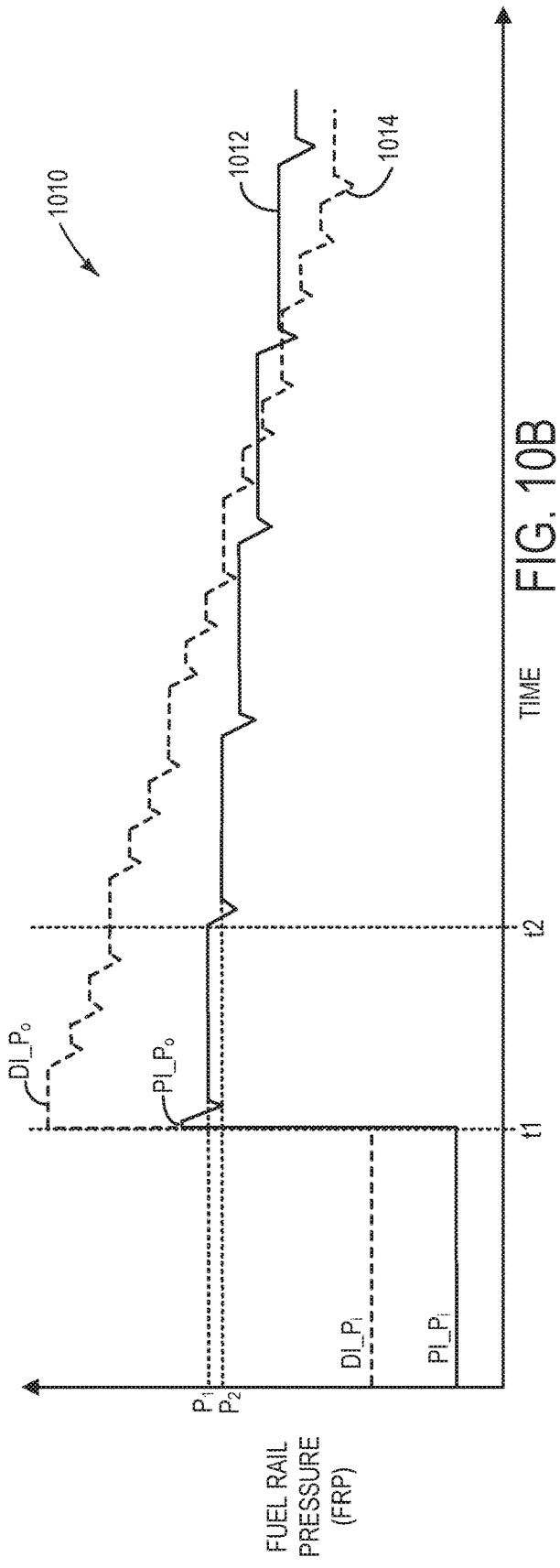

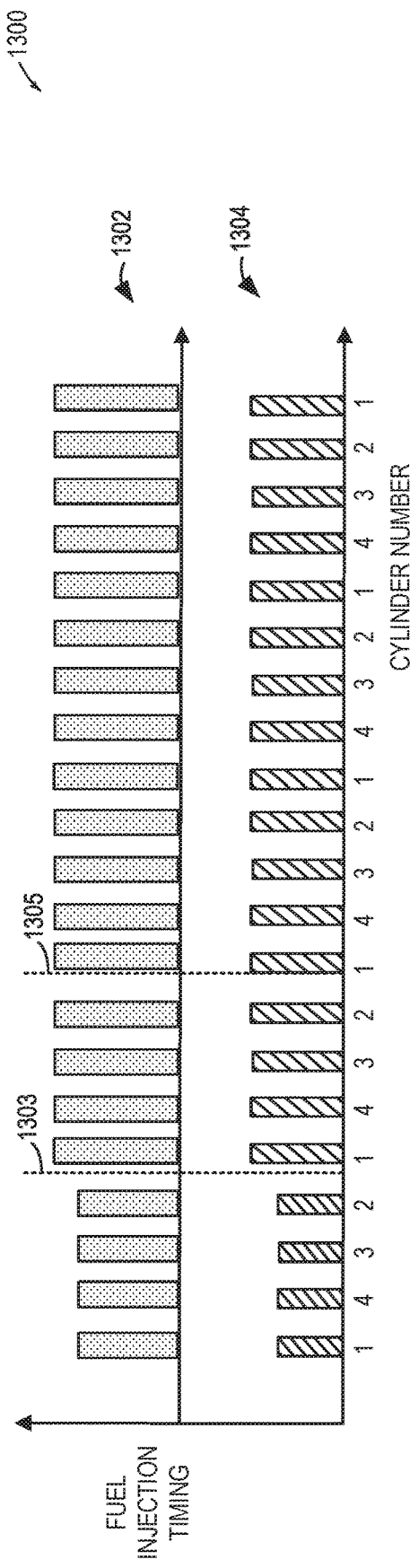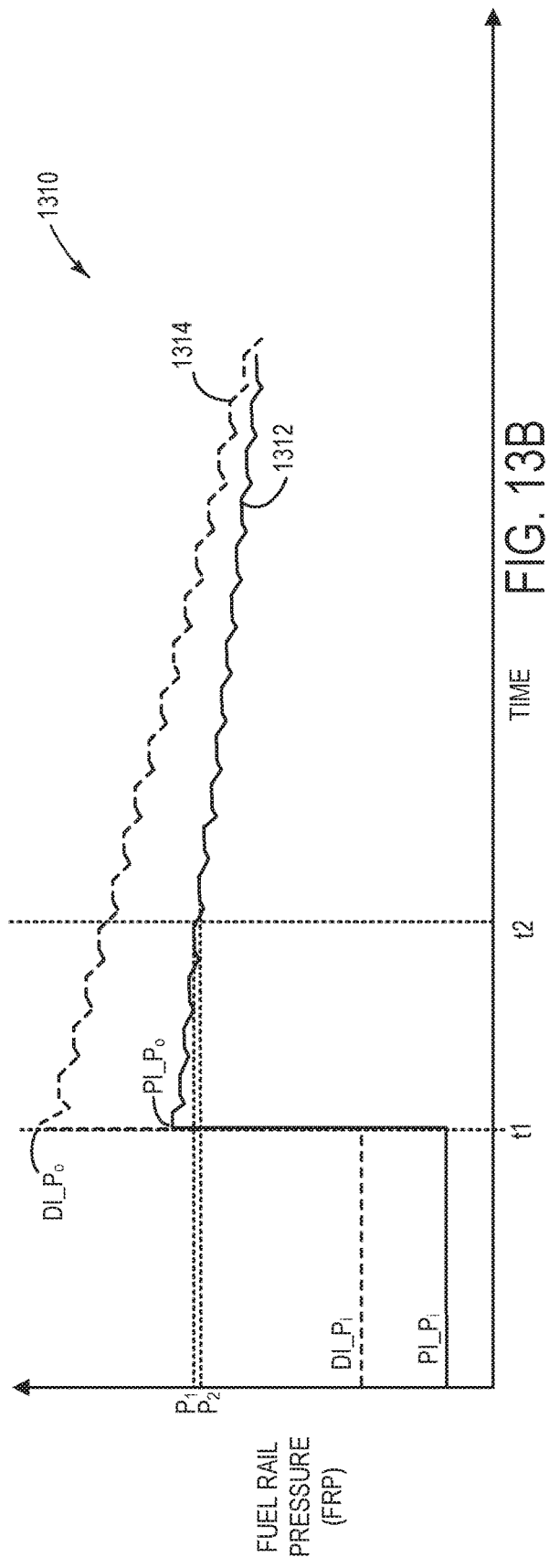

SYSTEMS AND METHODS FOR INFERERING FUEL INJECTION PRESSURE AND USES THEREOF

FIELD

The present description relates generally to methods and systems for inferring fuel injection pressures based on an electrical energy profile corresponding to activation and deactivation of fuel injectors, and uses for such inferred fuel injection pressures.

BACKGROUND/SUMMARY

Engines may be configured with direct fuel injectors (DI) for injecting fuel directly into an engine cylinder and/or port fuel injectors (PFI) for injecting fuel into an intake port of an engine cylinder. A basic concept of fuel injection is that a fuel injection pressure is known by either measurement (e.g., via a pressure sensor) or based on a pressure regulator setting. Based on the fuel injection pressure, control strategy may compute a requisite fuel injector open time in order to achieve a desired injection quantity per fuel injection event.

For example, it is known that PFI systems may be used without an injection pressure sensor, under conditions where a pressure regulator is employed to relieve excess fuel pressure, thereby mechanically achieving constant fuel line/fuel rail pressure. Such implementation may save on the cost of the pressure sensor along with reducing any adverse conditions stemming from situations where the pressure sensor may become degraded. However, it may be undesirable to operate such a fuel system without a pressure sensor under conditions where a pulsed lift fuel pump is used for supplying fuel to fuel injectors, due to a possibility of a failure mode that may introduce large pressure inaccuracy in the open loop behavior of such a fuel system. Thus, it is herein recognized that it may be desirable to rely on other methodology for inferring fuel injection pressure for fuel systems that include at least a pulsed lift pump and port fuel injectors, such that reliance on a dedicated pressure sensor may be reduced or avoided. Along similar lines, in a case where a pressure sensor is included in such a fuel system that includes a pulsed lift pump and at least port fuel injectors, having another way to infer fuel rail pressure may enable robust diagnostics to determine when the pressure sensor is exhibiting degraded functionality, and may enable the fuel system to be effectively operated in lieu of the degraded pressure sensor.

The inventors have recognized the above-mentioned issues, and have herein developed systems and methods to at least partially address them. In one example, a method comprises commanding a predetermined amount of a fuel to be injected into a cylinder of an engine via a fuel injector, monitoring an electrical energy profile associated with the fuel injector, inferring a fuel injection pressure based on the monitored electrical energy profile, and controlling a subsequent fuel injection based on the inferred fuel injection pressure. In this way, operation of a fuel injector itself may provide a reliable estimate of fuel injection pressure, which may be used for subsequent control of the fuel system and/or for diagnostics means.

As one example, the fuel to be injected into the cylinder of the engine may be contained in a fuel rail where the fuel rail does not include a pressure sensor for measuring the fuel injection pressure. The fuel rail may be a low pressure fuel rail in one example, where the fuel injector is a port fuel injector, or the fuel rail may be a high pressure fuel rail, where the fuel injector is a direct fuel injector in another example. In either example, the fuel injector may be of an inward-opening type of fuel injector.

As another example, controlling the subsequent fuel injection may include controlling a fuel injection pulse-width of a next-in-line fuel injection based on a firing order of the engine.

As another example, such a method may include determining a time to fully open the fuel injector based on the electrical energy profile, and inferring the fuel injection pressure based on the time to fully open the fuel injector. Additionally or alternatively, the method may include determining a time to fully close the fuel injector based on the electrical energy profile, and inferring the fuel injection pressure based on the time to fully close the fuel injector.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 10A-10B depict example maps that illustratively convey the methodology of FIG. 9;

FIGS. 13A-13B depict example maps that illustratively convey the methodology of FIG. 12;

DETAILED DESCRIPTION

Figure 1:
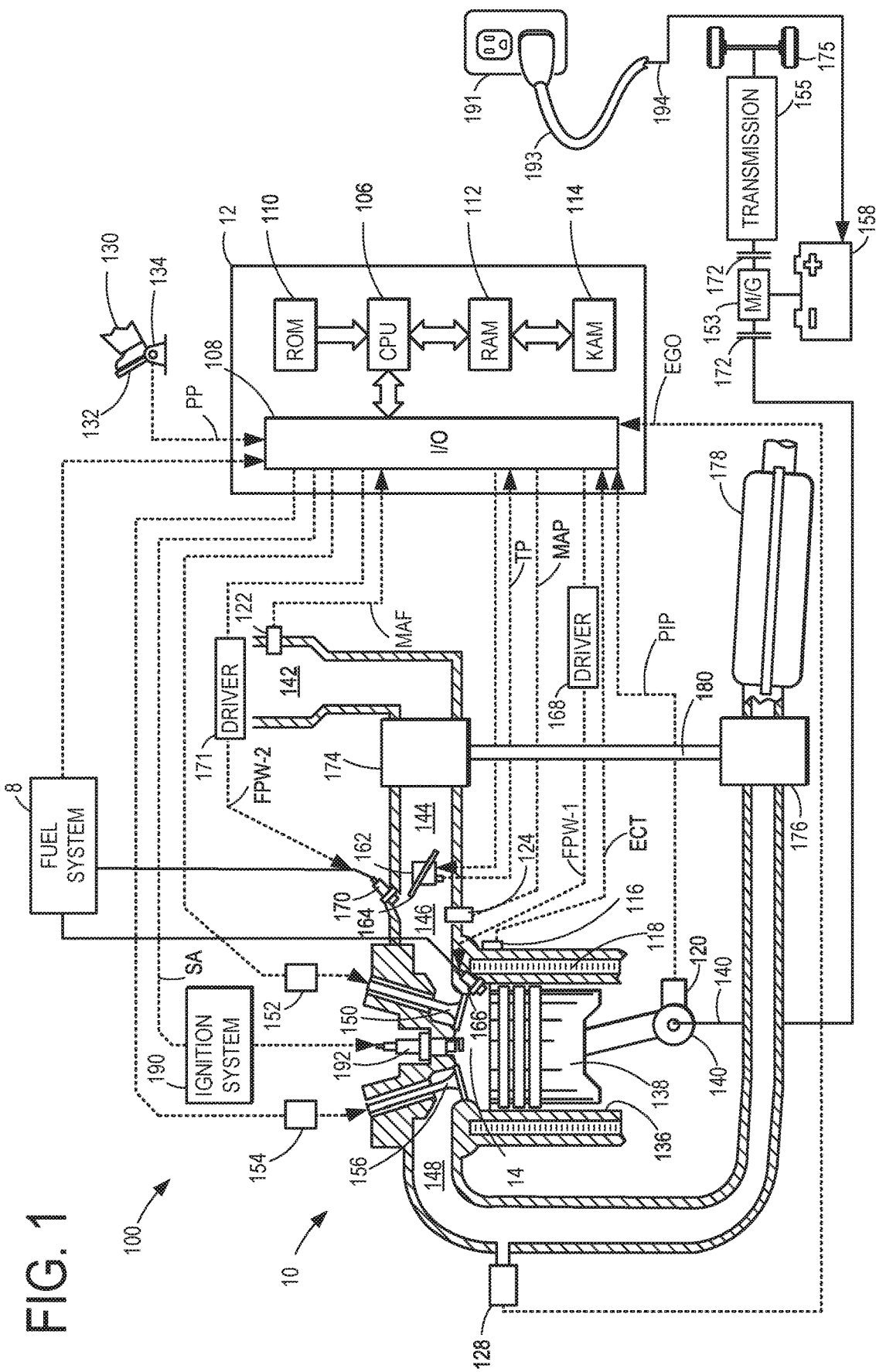
FIG. 1 schematically depicts an example embodiment of a cylinder of an internal combustion engine.
Figure 2:
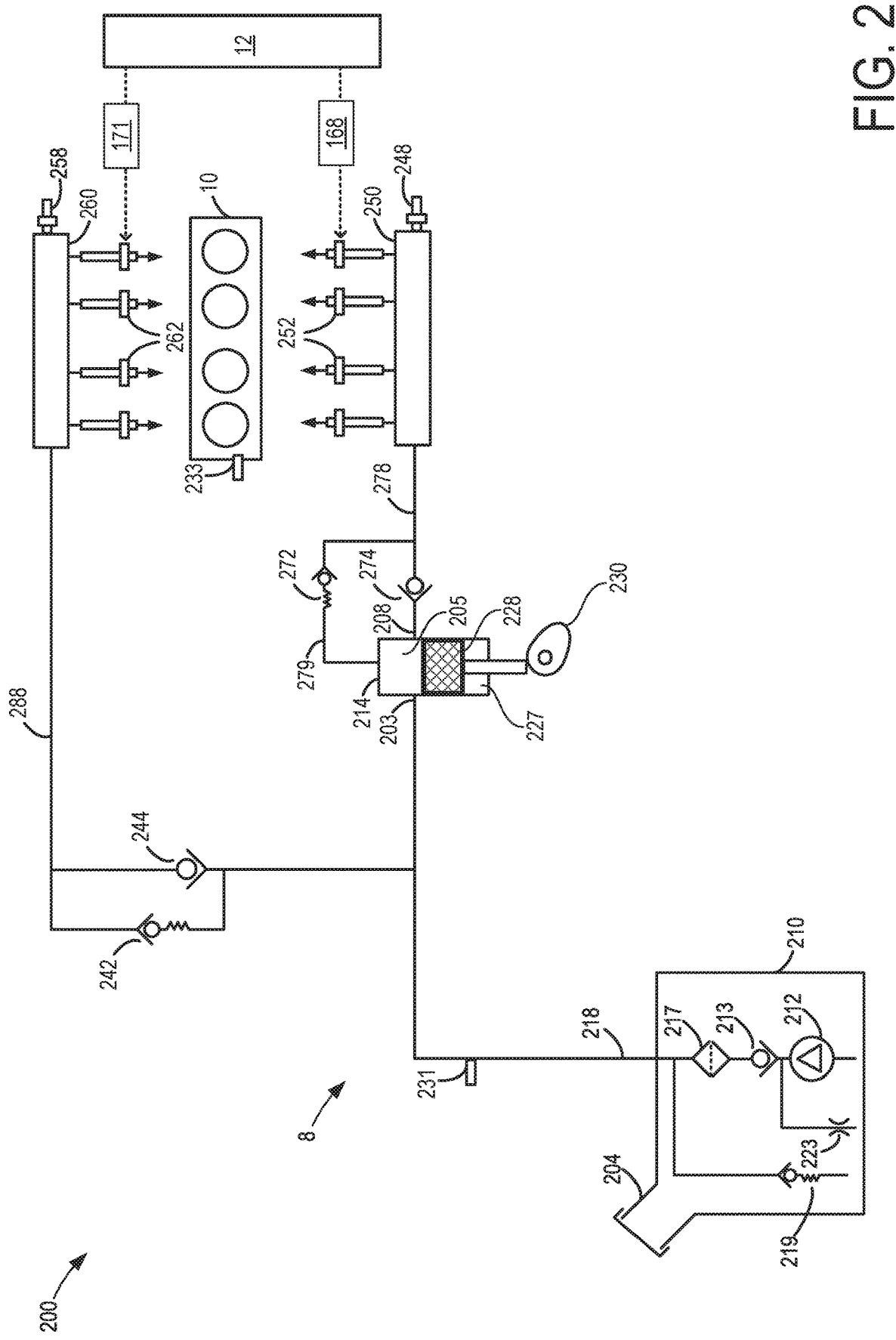
FIG. 2 schematically depicts an example embodiment of a fuel system, configured for port injection and direct injection that may be used with the engine of FIG. 1.

The following description relates to systems and methods for inferring fuel pressure in a fuel rail of a vehicle fuel system based on electrical energy profiles monitored during activation and/or deactivation of fuel injectors that supply fuel to an engine of the vehicle system. Accordingly, FIG. 1 depicts an example vehicle system that includes an engine system and a fuel system. FIG. 2 depicts a detailed view of the fuel system of FIG. 1, illustrating a dual fuel rail fuel system that includes a lift pump positioned in a fuel tank and a high pressure fuel pump that supplies fuel to one of the two fuel rails. Depicted at FIG. 2, a lower pressure fuel rail supplies fuel to port fuel injectors while a higher pressure fuel rail supplies fuel to direct fuel injectors. The methodology for inferring fuel pressure as discussed herein relates to inward-opening fuel injectors, of the type illustrated at FIG. 3. A high-level method for controlling the port injection and/or direct injection of fuel into engine cylinders is depicted at FIG. 4.

Figure 3:
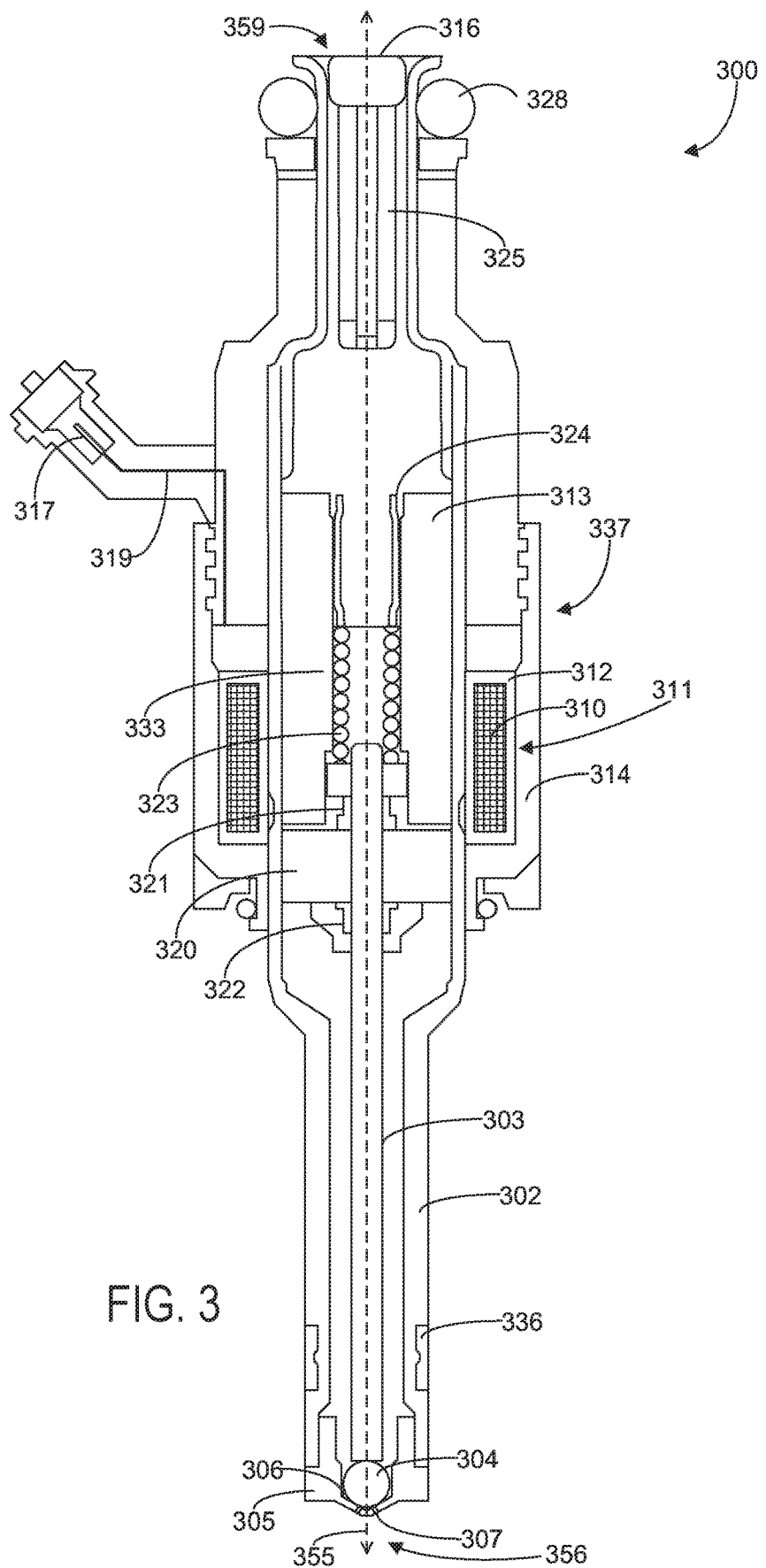
FIG. 3 depicts an example inward-opening fuel injector of the present disclosure.
Figure 4:
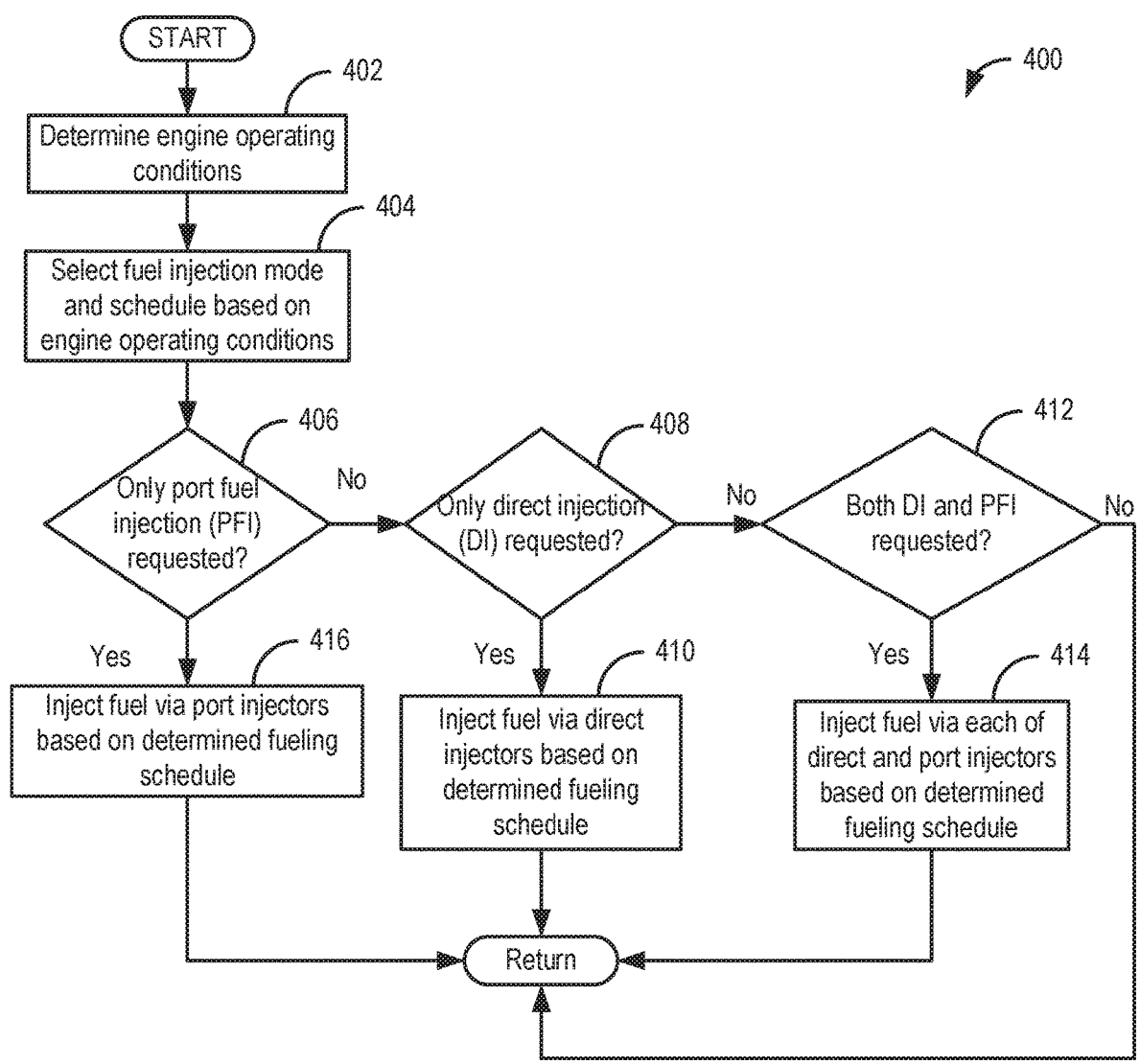
FIG. 4 depicts a high-level example method for controlling one or both of port fuel injection and direct injection of fuel to engine cylinders.

As mentioned above, the systems and methods discussed herein relate to inferring fuel pressure based on electrical energy profiles monitored during activation and/or deactivation of fuel injectors of the type depicted at FIG. 3. Accordingly, FIGS. 5A-5E depict example illustrations for how current and/or voltage profiles may be used to infer time-to-open and/or time-to-close determinations for fuel injectors of the present disclosure. FIGS. 6A-6B depict graphs showing how such time-to-open and/or time-to-close determinations may enable fuel pressure in a fuel rail to be inferred.

Figure 7:
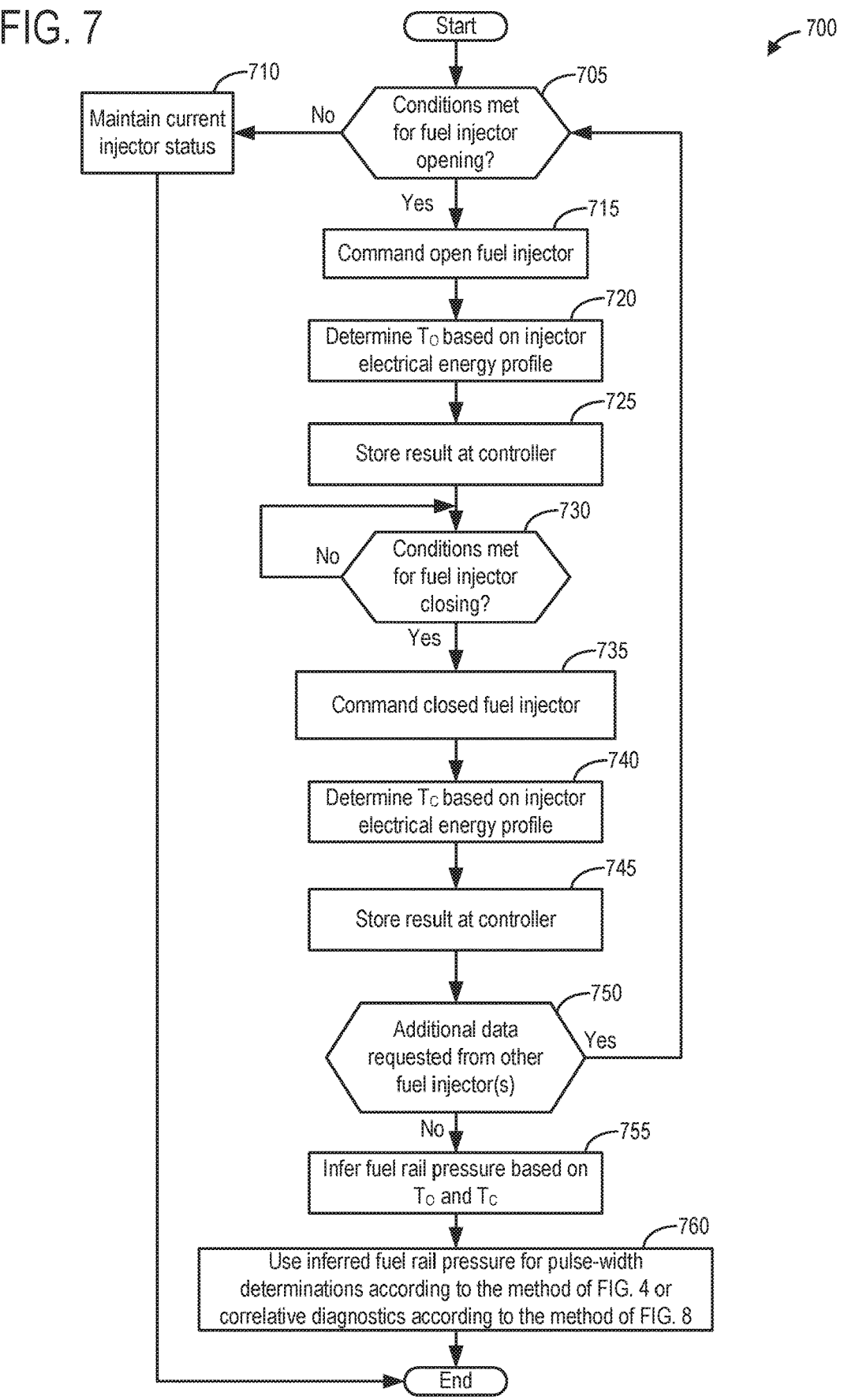
FIG. 7 depicts a high-level example method for inferring fuel pressure based on time-to-open and/or time-to-close determinations for individual fuel injectors.
Figure 8:
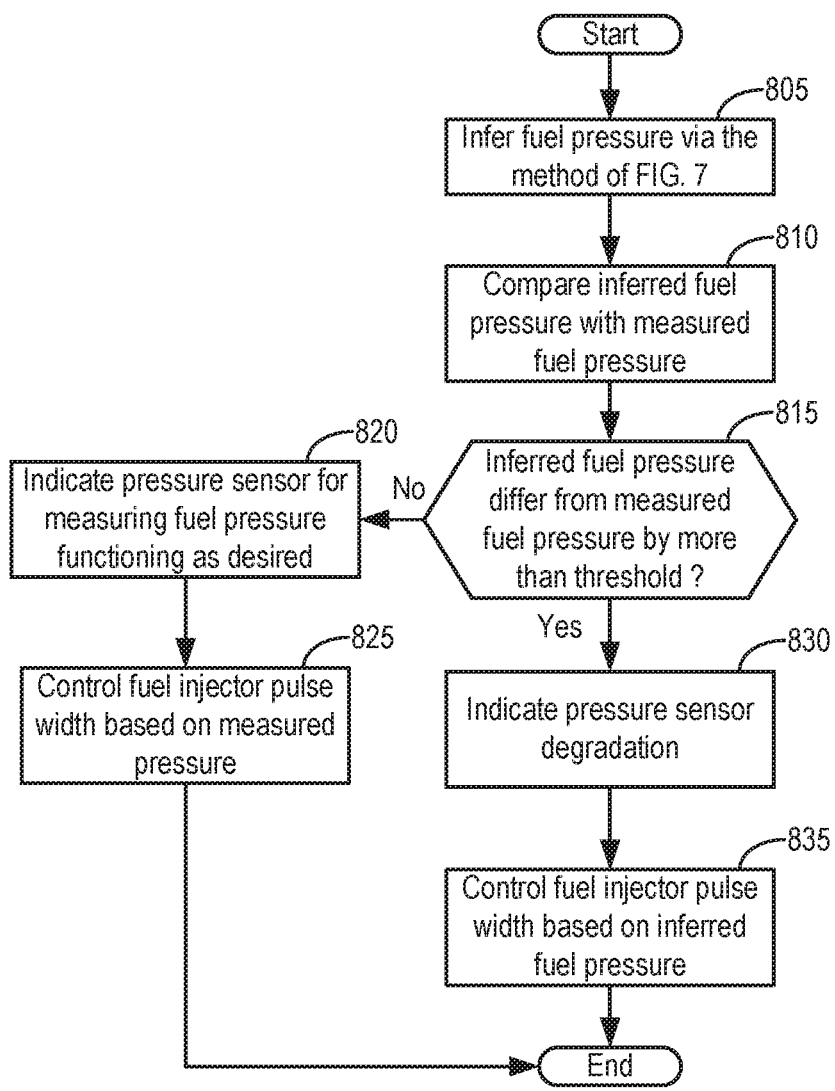
FIG. 8 depicts a high-level example method for determining whether a fuel rail pressure sensor is functioning as expected or desired based on fuel pressure inferences made via the methodology of FIG. 7.
Figure 9:
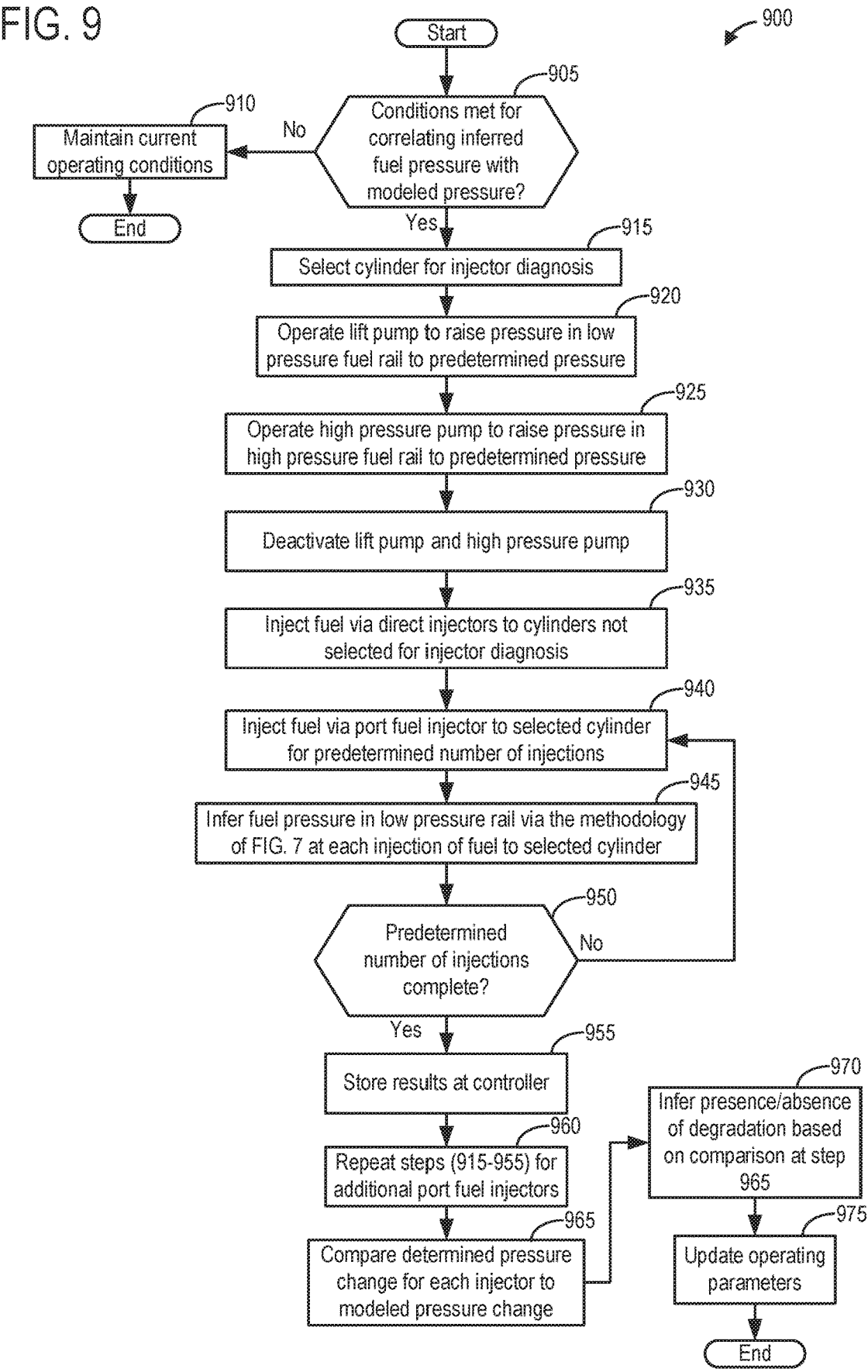
FIG. 9 depicts a high-level example method for inferring a presence or an absence of fuel system degradation for a fuel system that includes a lift pump and a fuel rail without a pressure sensor.
Figure 11A:
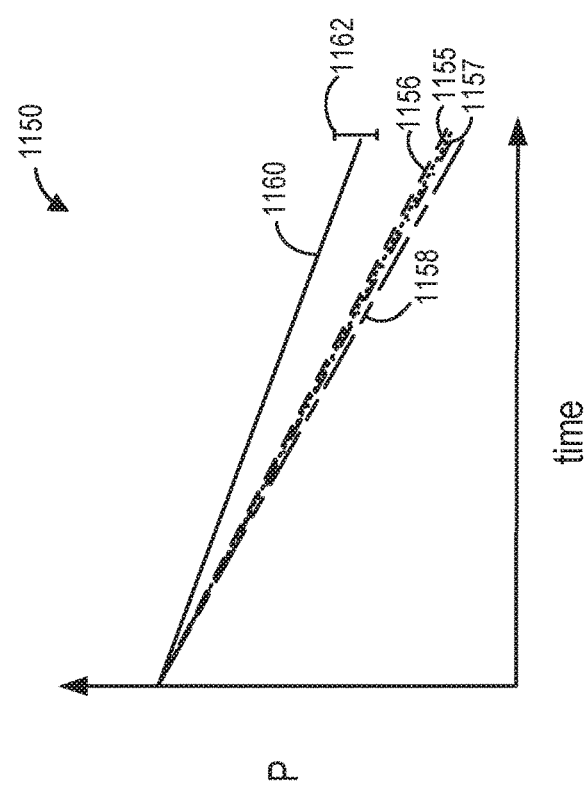
FIGS. 11A-11B depict example plots showing how data obtained via the methodology of FIG. 9 may be used to infer a presence or an absence of fuel system degradation.
Figure 11B:
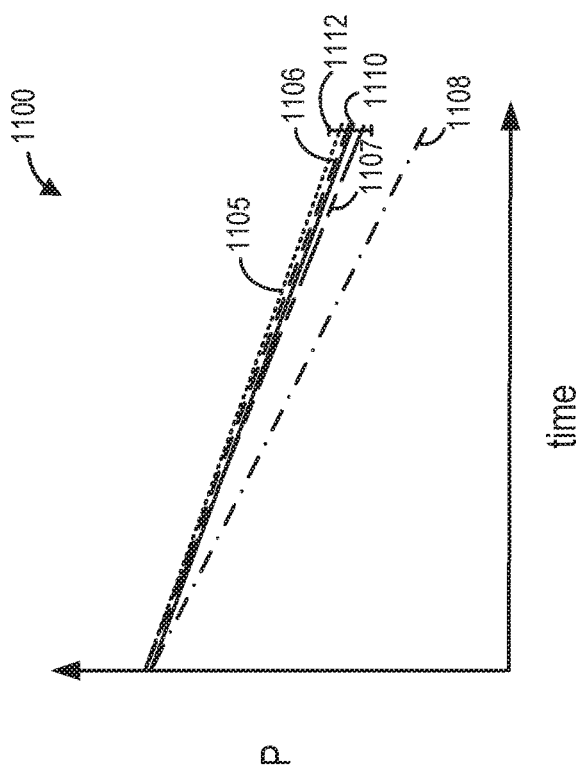
Figure 12:
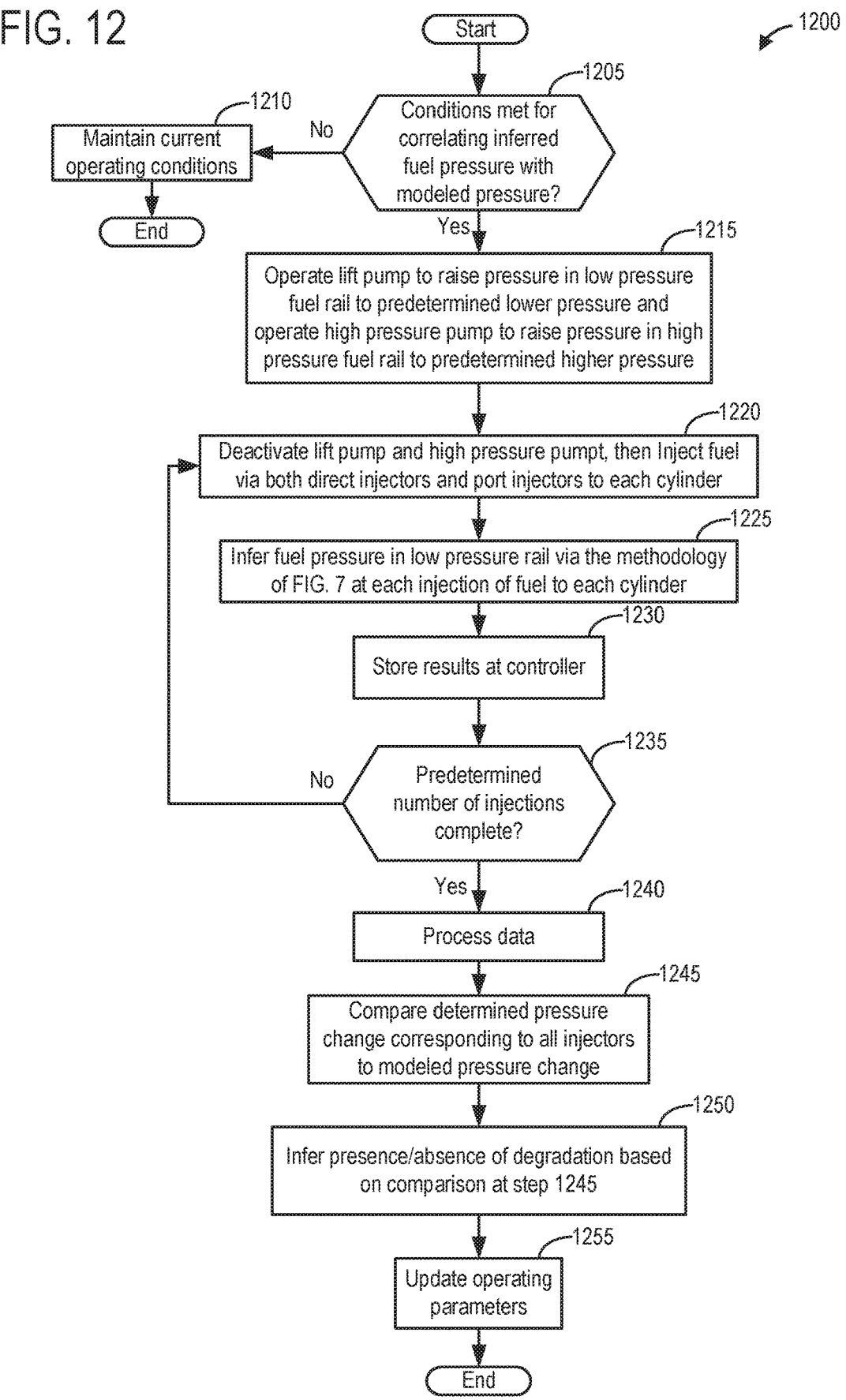
FIG. 12 depicts an alternate method for inferring a presence or an absence of fuel system degradation for a fuel system that includes a lift pump and a fuel rail without a pressure sensor.
Figure 14A:
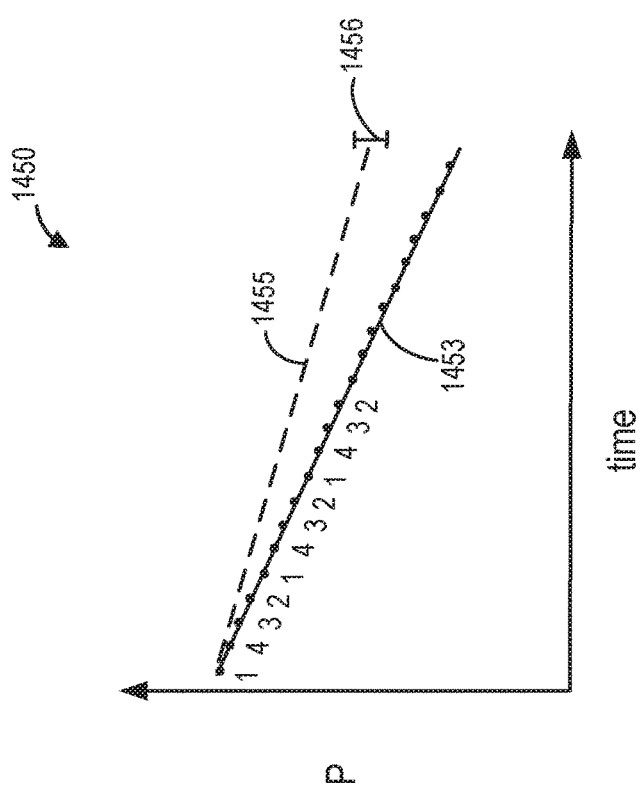
FIGS. 14A-14B depict example plots showing how data obtained via the methodology of FIG. 12 may be used to infer a presence or an absence of fuel system degradation.
Figure 14B:
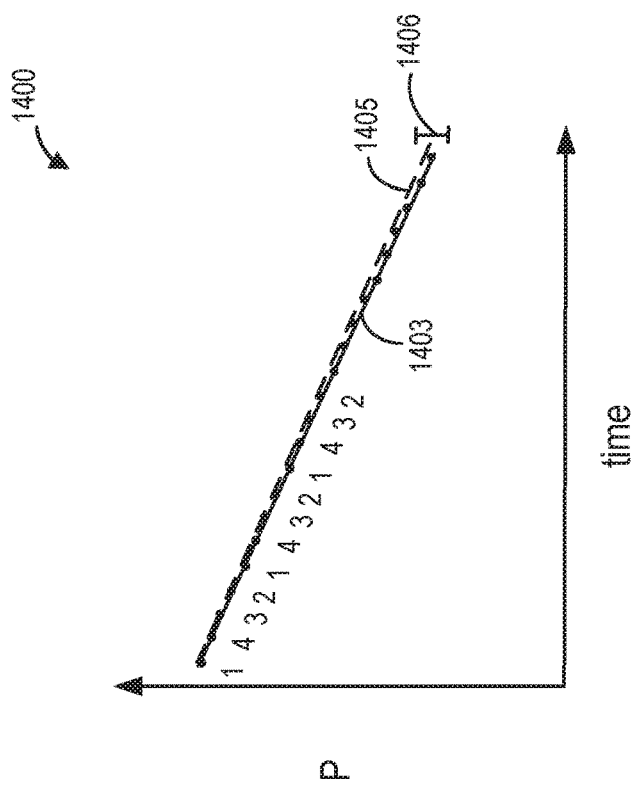

An example methodology for inferring fuel pressure based on electrical energy profiles for corresponding to activation and/or deactivation of fuel injectors of the present disclosure is depicted at FIG. 7. FIG. 8 depicts an example methodology for conducting a pressure sensor rationality check for a fuel rail pressure sensor, based on fuel pressure inferred via the methodology of FIG. 7. FIG. 9 depicts a high-level example method for inferring a presence or absence of fuel system degradation under conditions where the fuel system includes a fuel rail without a pressure sensor, and a lift pump. FIGS. 10A-10B depict example maps illustratively detailing the methodology of FIG. 9, and FIGS. 11A-11B depict example graphs illustrating how the methodology of FIG. 9 may be used to infer the presence or absence of fuel system degradation. FIG. 12 depicts an alternative high-level example methodology to that of FIG. 9 for inferring a presence or an absence of fuel system degradation under conditions where the fuel system includes a fuel rail without a pressure sensor, and a lift pump. FIGS. 13A-13B depict example maps illustratively detailing the methodology of FIG. 12, and FIGS. 14A-14B depict example graphs showing how the methodology of FIG. 12 may be used to infer the presence or absence of fuel system degradation.

Turning now to FIG. 1 depicted is an example of a combustion chamber or cylinder of internal combustion engine 10, included in vehicle system 100. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. It may be understood that driver 168 and driver 171 may in some examples be the same type of driver (e.g., the port fuel injector may be in some examples driving by a direct injection driver, to reduce or eliminate a dependency of battery voltage on time-to-open parameters for the port fuel injector). Thus, in some examples the type of driver that is used to drive port fuel injectors and direct injectors may be the same, whereas in other examples the type of driver that is used to drive port fuel injectors and direct injectors may be different. However, it may be understood that a PFI driver may not be used for driving direct fuel injectors.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 8 may include one or more fuel tanks. Fuel tank(s) in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling. While the above discussion related to a fuel system with two fuel tanks, it may be understood that the fuel system may simply include a single fuel tank in other examples, without departing from the scope of this disclosure.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Vehicle system 100 may include multiple sources of torque available to one or more vehicle wheels 175. In the example shown, vehicle system 100 is a hybrid electric vehicle system (HEV) that includes an electric machine 153, however in other examples vehicle system may not be a hybrid electric vehicle system without departing from the scope of this disclosure. Electric machine 153 may be a motor or a motor/generator. Crankshaft 140 of engine 10 and electric machine 153 are connected via a transmission 155 to vehicle wheels 175 when one or more clutches 172 are engaged. In the depicted example, a first clutch is provided between crankshaft 140 and electric machine 153, and a second clutch is provided between electric machine 153 and transmission 155. Controller 12 may send a signal to an actuator of each clutch 172 to engage or disengage the clutch, so as to connect or disconnect crankshaft from electric machine 153 and the components connected thereto, and/or connect or disconnect electric machine 153 from transmission 155 and the components connected thereto. Transmission 155 may be a gearbox, a planetary gear system, or another type of transmission. The powertrain may be configured in various manners including as a parallel, a series, or a series-parallel hybrid vehicle.

Electric machine 153 receives electrical power from a traction battery 158 (also described herein as onboard energy storage device, energy storage device, or battery) to provide torque to vehicle wheels 175. Electric machine 153 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 194. As a non-limiting example, vehicle system 100 may be configured as a plug-in hybrid electric vehicle (PHEV), whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

FIG. 2 schematically depicts an example embodiment 200 of fuel system 8 discussed above at FIG. 1. Fuel system 8 may be operated to deliver fuel to an engine, such as engine 10 of FIG. 1. Fuel system 8 may be operated by a controller to perform some or all of the operations described with reference to the method of FIG. 3.

Fuel system 8 includes a fuel storage tank 210 for storing the fuel on-board the vehicle, a lower pressure fuel pump (LPP) 212 (herein also referred to as pulsed fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by controller 12 to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could adversely impact fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group, refer to fuel injector 166 at FIG. 1). Fuel lifted by the LPP 212 may also be supplied to a second fuel rail 260 coupled to one or more fuel injectors of a second group of port injectors 262 (herein also referred to as a second injector group, refer to fuel injector 170 at FIG. 1). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 (e.g., direct injectors) for each cylinder of the engine while second fuel rail 260 may dispense fuel to one fuel injector of second injector group 262 (e.g., port fuel injectors) for each cylinder of the engine. Controller 12 can individually actuate each of the port injectors 262 via port injection driver 171 and actuate each of the direct injectors 252 via direct injection driver 168. The controller 12, the drivers 171, 168 and other suitable engine system controllers can comprise a control system. While the drivers 171, 168 are shown external to the controller 12, it should be appreciated that in other examples, the controller 12 can include the drivers 171, 168 or can be configured to provide the functionality of the drivers 171, 168. Controller 12 may include additional components not shown, such as those included in controller 12 of FIG. 1. As discussed above, in some examples the driver 171 may be a direct injection driver and driver 168 may also be a direct injection driver. As mentioned above, relying on a DI driver may reduce or eliminate a dependency of battery voltage on time-to-open parameters for port fuel injectors.

HPP 214 may be an engine-driven, positive-displacement pump. As one non-limiting example, HPP 214 may be a Bosch HDP5 High Pressure Pump, which utilizes a solenoid activated control valve (e.g., fuel volume regulator, magnetic solenoid valve, etc.) to vary the effective pump volume of each pump stroke. The outlet check valve 274 of HPP is mechanically controlled and not electronically controlled by an external controller. HPP 214 may be mechanically driven by the engine in contrast to the motor driven LPP 212, however in other examples HPP 214 may be electronically controlled without departing from the scope of this disclosure. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 12.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump 214. Readings from sensor 231 may be used to assess the operation of various components in fuel system 8, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 may include a first fuel rail pressure sensor 248 for providing an indication of direct injection fuel rail pressure to the controller 12, however first fuel rail 250 may not include the first fuel rail pressure sensor in other examples without departing from the scope of this disclosure. Likewise, second fuel rail 260 may include a second fuel rail pressure sensor 258 for providing an indication of port injection fuel rail pressure to the controller 12, however second fuel rail 260 may not include the second fuel rail pressure sensor in other examples without departing from the scope of this disclosure. An engine speed sensor 233 can be used to provide an indication of engine speed to the controller 12. The indication of engine speed may be used to identify the speed of HPP 214, under conditions where HPP 214 is mechanically driven by the engine 10, for example, via the crankshaft or camshaft.

First fuel rail 250 is coupled to an outlet 208 of HPP 214 along fuel passage 278. Outlet check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel. While the above discussion included pump relief valve 272 and pressure relief valve 242, in other examples pump relief valve 272 and pressure relief valve 242 may not be included, without departing from the scope of this disclosure.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 may be disabled. In another example, during mid load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 may be disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

FIG. 3 shows a schematic diagram of an example fuel injector 300 which may be used to supply fuel from a fuel system, e.g., fuel system 8, to an engine, e.g., engine 10. Fuel injector 300 may be any type of injector. For example, fuel injector 300 may be a direct injector (e.g., direct injector 166 at FIG. 1) or a port fuel injector (e.g., port injector 170 at FIG. 1). It may be understood that fuel injector 300 can be referred to as an inward-opening injector, based on the manner in which the fuel injector opens, as will be elaborated in greater detail below.

Fuel injector 300 includes a nozzle body 302 which may be used as valve-seat support and part of a valve housing. A valve mechanism 303 within nozzle body 302 is displaceable in an axial direction, e.g., along a central axis 355 of fuel injector 300. Valve mechanism 303 may be a pintle or needle which is slideable in a direction of central axis 355, for example. In some examples, valve mechanism 303 may be composed at least partially of a material that is permanently magnetized. For example, valve mechanism 303 may be composed of a material, such as iron, which can be magnetized by an external magnetic field and remain magnetized after the external field is removed. In other examples, valve mechanism 303 may be substantially composed of a ferromagnetic material, such as iron, nickel, cobalt and/or alloys thereof.

Fuel injector 300 may be an inwardly opening fuel injector, which has at least one spray-discharge orifice 307 formed in valve-seat body 305 so that when an injector driver circuit 311 is activated to actuate the valve mechanism, the valve mechanism 303 lifts off from the valve mechanism seat 305 to create a gap between valve closure member 304 and valve seat surface 306 so that fuel may flow out orifices 307.

Valve mechanism 303 is coupled to a valve-closure member 304, which cooperates with a valve-seat surface 306 formed on a valve mechanism seat body 305 to form a sealing seat. Valve mechanism seat body 305 may be fixedly coupled to the downstream end 356 of nozzle body 302. However, valve-seat surface 306 may also be formed directly on a base part of nozzle body 302. For example, valve-closure member 304 may be ball-shaped or frusto-conical-shaped so that in a closed position valve-closure member 304 engages with valve-seat surface 306 to shut off fuel flow through the fuel injector via orifices, e.g., orifices 307, in the downstream end 356 of the fuel injector.

In some examples, valve mechanism 303 may penetrate an armature 320 in an inner opening in an upstream valve housing 337. Armature 320 may be coupled to valve mechanism 303 so as to be axially displaceable along a direction of central axis 355. The path of magnetic armature 320 in the direction of the central axis 355 may be restricted by a first, upper flange 321, which may be integrally formed with an upstream portion of valve mechanism 303, and a second, lower flange 322, which is coupled to valve mechanism 303 downstream of armature 320. Braced on first flange 321 is a restoring spring 323 which biases the valve mechanism 303 in a closed position against the valve mechanism seat 305. Restoring spring 323 may be pre-stressed by an adjustment sleeve 324.

Upstream valve housing 337 includes an injector driver circuit 311 which actuates the valve mechanism in response to a start of injection (SOI) event. The injector driver circuit 311 may include an electromagnetic actuator for actuating the valve mechanism and may include a magnetic coil 310 wound onto a coil brace 312, which rests against a connection piece 313 acting as inner pole 333. Current may be supplied to the magnetic coil in two opposite directions and at varying amounts depending on operating conditions. In an outward direction from central axis 355, the magnetic circuit may be sealed by an outer magnetic component 314. Magnetic coil 310 is energized via a line 319 by an electric current that may be supplied via an electric plug contact 317.

The fuel is supplied via a central fuel supply 316 at an upstream end 359 of fuel injector 300 and filtered by a filter element 325 inserted therein. Fuel injector 300 may be sealed from a fuel distributor line, e.g., fuel rail, by a seal 328 and from a cylinder head, e.g., cylinder 14, by another seal 336.

In particular, fuel injector 300 may receive fuel pulse width signal FPW from controller 12 to control fuel injection. Signal FPW governs fuel injection by energizing electromagnetic actuator coil 310 to initiate the start of injection (SOI) of fuel from fuel injector 300. Additionally, FPW may dictate the end of injection (EOI) of fuel from fuel injector 300. In particular, during fuel injection, pressurized fuel may be supplied from a fuel rail (e.g., first fuel rail 250 or second fuel rail 260 at FIG. 2) to fuel injector 300 via inlet 316, the flow of which is governed by electromagnetic actuator having coil 310, coupled to valve mechanism 303 which lifts from valve seat 305 to spray fuel into cylinder 14.

In operation, restoring spring 323 acts upon first flange 321 of valve needle 303 to counter to its lift direction, so that valve-closure member 304 is retained in sealing contact against valve seat surface 306. Excitation of magnetic coil 310 may be performed by supplying a first amount of current in a first direction through magnetic coil 310. The first amount current in the first direction generates a magnetic field which attracts valve mechanism 303 upwards to lift valve mechanism 303 off of valve seat 305. For example, the magnetic field may move magnetic armature 320 in the lift direction to counter to the spring force of restoring spring 323. The overall lift of the valve mechanism may be defined by a working gap existing between connection piece 313 and magnetic armature 320 in the rest position. Magnetic armature 320 carries along first flange 321 in the lift direction as well. Valve-closure member 304, which is connected to valve mechanism 303, lifts off from valve seat surface 306 and the fuel is spray-discharged through spray-discharge orifices 307.

In the case where the valve mechanism in composed of a permanently magnetized material, a magnetic field is present in the valve mechanism, e.g., a magnetic dipole moment of the valve mechanism may extend along a direction of a central axis of the valve mechanism. In this case, the direction of current supplied to injector driver 311 may be chosen so that the magnetic field generated by magnetic coil 310 has a magnetic dipole moment opposite in direction to the magnetic dipole moment of the valve mechanism so that the magnetic field generated by magnetic coil 310 attracts the permanently magnetized valve mechanism to lift the valve mechanism from the valve mechanism seat. In this example, an amount of current supplied to the injector driver may be reduced since the magnetic field in the valve mechanism provides additional force to lift the valve mechanism.

In response to an end of injection event, the first amount of current supplied to injector driver 311 in the first direction is discontinued, and following sufficient decay of the magnetic field, magnetic armature 320 drops away from connection piece 313 due to the pressure of restoring spring 323, so that valve mechanism 303 moves counter to the lift direction. Valve closure member 304 sets down on valve seat surface 306, and fuel injector 300 is closed again.

FIGS. 1-3 show example configurations of the fuel system with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Discussed herein, a system for a vehicle may comprise a fuel system that includes a pulse lift pump that supplies a fuel from a fuel tank to a low pressure fuel rail, and a set of port fuel injectors that supply fuel from the low pressure fuel rail to a set of cylinders of an engine. The system may further comprise a controller with computer readable instructions stored on non-transitory memory that when executed, cause the controller to command a predetermined amount of the fuel to be injected into a cylinder of the set of cylinders via a port fuel injector of the set of port fuel injectors. The controller may store further instructions to determine a fuel injection pressure of the fuel in the fuel rail based on a time to fully open the port fuel injector and/or a time to fully close the fuel injector, and control a fuel injection pulse width for a subsequent fuel injection to another engine cylinder based on the fuel injection pressure.

For such a system, the set of port fuel injectors may be inward-opening fuel injectors that include a valve mechanism for which an opening rate and a closing rate of the valve mechanism is a function of the fuel injection pressure.

For such a system, the low pressure fuel rail may not include a pressure sensor.

For such a system, the controller may store further instructions to continually update the fuel injection pressure based on the time to fully open each fuel injector and/or the time to fully close each fuel injector as the engine operates in a combusting mode.

For such a system, the controller may store further instructions to infer the time to fully open the port fuel injector and/or the time to fully close the fuel injector based on a monitored electrical energy profile corresponding to activation and/or deactivation, respectively, of the fuel injector.

For such a system, the fuel rail may include a pressure sensor, and the controller may store further instructions to indicate that the pressure sensor is degraded in response to an indication that the fuel injection pressure differs from a monitored fuel injection pressure as indicated by the pressure sensor by more than a predetermined threshold, and control the fuel injection pulse width for the subsequent fuel injection to another cylinder based on the fuel injection pressure responsive to the pressure sensor being indicated to be degraded.

For such a system, the time to fully open the port fuel injector may be independent of a voltage supplied to the port fuel injector.

FIG. 4 illustrates an example high-level method 400 for controlling fuel injectors (e.g., direct fuel injectors 166 and/or port fuel injectors 170 at FIG. 1). Instructions for carrying out method 400 and the rest of the methods included herein may be executed by the controller (e.g., controller 12 at FIG. 1) based on instructions stored on a memory of the controller and in conjunction with signals received from sensors of the engine system, such as the sensors described above with reference to FIGS. 1 and 2. The controller may employ actuators of the engine (e.g., engine 10 at FIG. 1) and/or fuel system (e.g., fuel system 8 at FIG. 2) to alter states of devices in the physical world, according to the methods described below.

At 402, engine operating conditions may be determined by the controller. The engine operating conditions may include engine load, engine temperature, engine speed, operator torque demand, etc. Depending on the estimated operating conditions, a plurality of engine parameters may be determined. For example, at 404, a fuel injection schedule may be determined. This may include determining an amount of fuel to be delivered to a cylinder (e.g., based on the torque demand), as well as an injection timing. Further, a fuel injection mode best suited for the current engine operating conditions may be selected. In one example, at high engine loads, direct injection (DI) of fuel into an engine cylinder via a direct injector may be selected in order to leverage the charge cooling properties of the DI so that engine cylinders may operate at higher compression ratios without incurring undesirable engine knock. If direct injection is selected, the controller may determine whether the fuel is to be delivered as a single injection or split into multiple injections, and further whether to deliver the injection(s) in an intake stroke and/or a compression stroke. In another example, at lower engine loads and at engine starts (especially during cold-starts), port injection (PFI) of fuel into an intake port of the engine cylinder via a port fuel injector may be selected in order to reduce particulate matter emissions. If port injection is selected, the controller may determine whether the fuel is to be delivered during a closed intake valve event or an open intake valve event. There may be still other conditions where a portion of the fuel may be delivered to the cylinder via the port injector while a remainder of the fuel is delivered to the cylinder via the direct injector. Determining the fuel injection schedule may also include, for each injector, determining a fuel injector pulse-width as well as a duration between injection pulses based on the estimated engine operating conditions.

At 406, the routine includes determining if only port fuel injection has been requested based on the current engine operating parameters. Only PFI may be requested, for example, during conditions of low engine load and low engine temperature, as well as engine starts. If it is determined that PFI-only is not currently being requested, at 408, the routine may include determining if only direct injection has been requested. DI may be desirable, for example, during high engine load and/or during conditions of high engine temperature. If it is determined that only DI is requested, at 410, fuel may be injected into the engine via the direct injectors (such as the direct injectors 252 in FIG. 1). The controller may adjust an injection pulse-width of the direct injectors in order to provide fuel via the direct injectors according to the determined fueling schedule. The pulse-width may be determined in some examples as a function of a fuel injection pressure (e.g., pressure of fuel in the corresponding fuel rail). As will be elaborated in greater detail below, the fuel injection pressure may in some examples be inferred based on an electrical energy profile corresponding to fuel injector activation/deactivation (e.g., actuation and de-actuation of the fuel injector). It may be understood that in a case where only DI is requested, PFI may be discontinued. With PFI discontinued, a pressure build due to, for example, thermal expansion of fuel in the fuel rail that supplies fuel to the PFIs (e.g., second fuel rail 260 at FIG. 2) may be relieved via pressure relief valve 242.

If it is determined that only PFI or only DI is not desired for fueling, at 412, the routine may determine if both DI and PFI are requested for fuel injection. If it is determined that both direction injection and port injection have been requested, at 414, the controller may send a signal to actuators coupled to each of the direct injector and the port injector to initiate fueling based on a determined fueling schedule. Each injector may deliver a portion of a total fuel injection for combustion. The distribution and/or relative amount of fuel delivered from each injector may vary based on operating conditions, such as engine load, knock, exhaust temperature, etc. If both DI and PFI are not requested at 412, it may be understood that the vehicle may be operating in an electric-only mode of operation, and such operating parameters may be maintained. Fuel injection pulse-width may be controlled for each injector type as a function of fuel injection pressure in the corresponding fuel rail, and as discussed above the fuel injection pressure may in some examples be inferred based on electrical energy profiles of individual fuel injector activation/deactivation, the electrical energy profiles corresponding to time-to-open and/or time-to-close parameters as will be elaborated below.

Returning to 406, if it is determined that only PFI is desired, at 416, the controller may command the determined pulse width to the port injector (such as the port injectors 170 at FIG. 1) to initiate fuel injection. In addition, it may be understood that the controller may deactivate the direct injectors. With DI discontinued, a pressure build due to, for example, thermal expansion of fuel in the fuel rail that supplies fuel to the DIs (e.g., first fuel rail 250 at FIG. 2) may be relieved via pump relief valve 272.

As discussed above, controlling fuel injectors in order to achieve desired engine operational conditions may include determining a fuel injector pulse-width. The fuel injector pulse-width determines how much fuel is injected into the corresponding engine cylinder, and is a function of fuel rail pressure. In other words, the basic concept of fuel injection is that the injection pressure is known and then the required open time of the injector may be computed based on the injection pressure to achieve a desired injection quantity per injection event. In one example, fuel rail pressure may be determined via a pressure sensor (e.g., first fuel rail pressure sensor 248 or second fuel rail pressure sensor 258 at FIG. 2). Additionally or alternatively, fuel rail pressure may be determined as a function of a known pressure regulator setting.

As mentioned above, it may be desirable to infer fuel rail pressure by another means. For example, the pressure sensor may fail in some circumstances. In other examples, inferring fuel rail pressure by another means may enable diagnostics to be performed on an existing fuel rail pressure sensor. In some examples, being able to infer fuel rail pressure by another means may enable an ability to control fuel injection without relying on such a sensor, which may reduce complexity and costs. Along similar lines, in some examples being able to infer fuel rail pressure by another means may enable an ability to avoid a pressure regulator aspect of fuel delivery systems, which may reduce complexity and costs.

It is herein recognized that it may be possible to use a fuel injector itself as a pressure measurement device. Fuel injectors may be either inward-opening (refer to fuel injector 300 at FIG. 3), or outward-opening (not shown). In a case of an inward-opening fuel injector, the electrically derived force to open the injector has to overcome not just the bias force of the spring (e.g., restoring spring 323 at FIG. 3), but additionally has to overcome the fuel pressure acting against the pintle (refer to valve mechanism 303 at FIG. 3) of the fuel injector. Thus, in terms of opening a fuel injector, higher fuel pressures may result in a longer time-to-open as compared to lower fuel pressures. Along similar lines, higher fuel pressures may result in faster time-to-close parameters, as compared to lower fuel pressures. Accordingly, as will be elaborated in further detail below, it may be possible to infer fuel pressure based on a fuel injector time-to-open and/or time-to-close measurements.

Figure 5A:
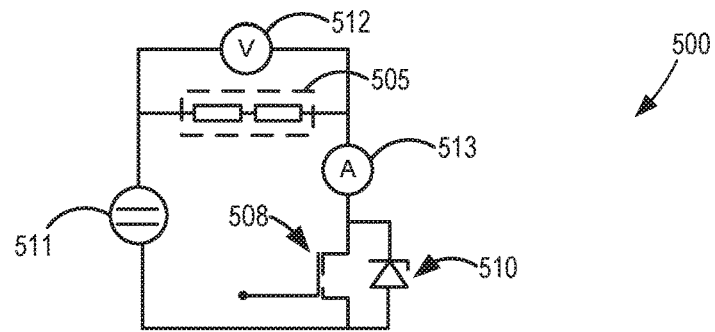
FIGS. 5A-5E depict example illustrations detailing how electrical energy profiles corresponding to activation and/or deactivation of fuel injectors of the type depicted at FIG. 3 may be used to infer time-to-open and time-to-close for the fuel injectors.
Figure 6B:
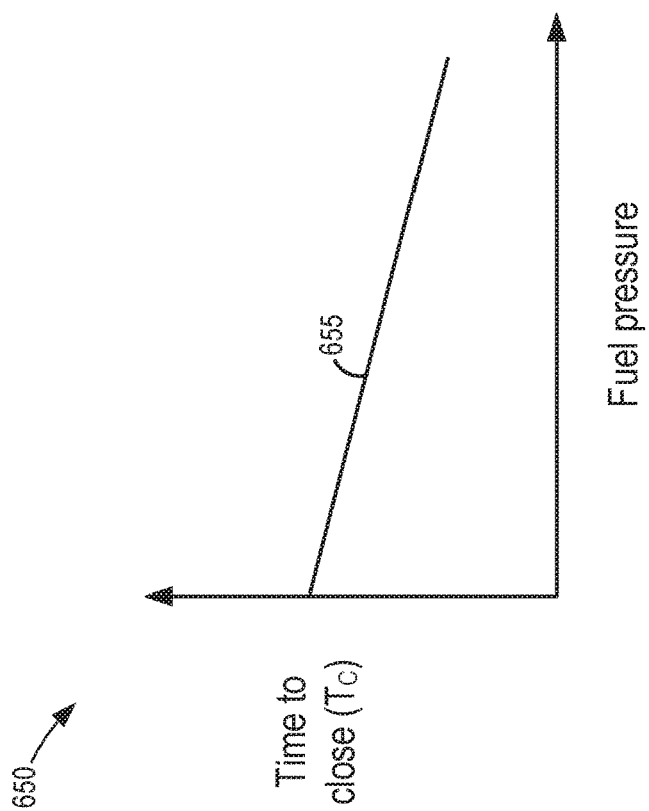
FIGS. 6A-6B depict example plots detailing how knowledge of time-to-open and time-to-close inferences based on electrical energy profiles for activation and deactivation of a fuel injector can enable a determination of fuel pressure.
Figure 6A:
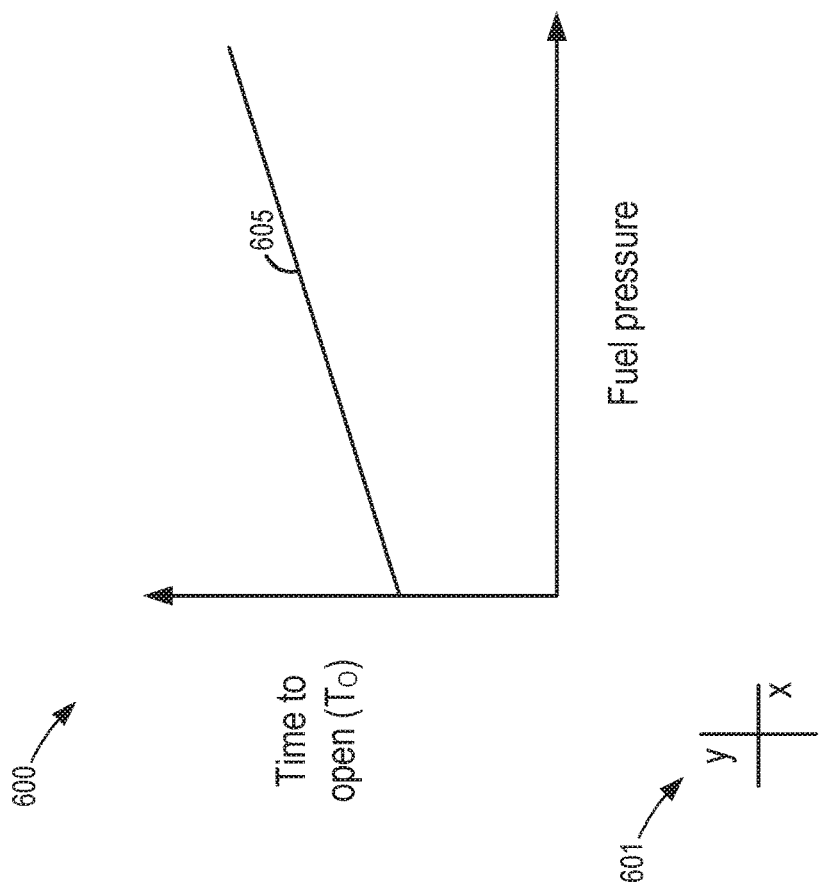

Turning to FIG. 5A, an example circuit 500 is shown that may be used in some examples to actuate a fuel injector. Specifically, a fuel injector 505 (e.g., same as fuel injector 166, or same as fuel injector 170) may be actuated via the controller (e.g., controller 12 at FIG. 1), via circuit 500 that comprises a low-side power switch 508 with a Zener diode 510 in parallel. It may be understood that Zener diode 510 may protect circuit 500 from an overvoltage due to a self-induction, which may occur when the energization of the injector coil is stopped, for example.

In power-off mode with a current-less coil (e.g., coil 310 at FIG. 3), the valve mechanism (e.g., valve mechanism 303 at FIG. 3) may be seated against the valve seat (e.g., valve mechanism seat 305 at FIG. 3) by the spring (e.g., restoring spring 323 at FIG. 3) and a force of fuel pressure in the fuel rail. When power supply 511 is commanded on, the coil may be energized and an electromagnetic field may arise, thus de-seating the valve mechanism from the valve seat and enabling fuel to be injected to an engine cylinder. Deactivating of the energizing current may again lead to a closing of the injector. As will be elaborated in greater detail below, measuring voltage at first circuit location 512 and measuring current at second circuit location 513 may enable a determination as to when the fuel injector is fully open and fully closed.

Figure 5B:
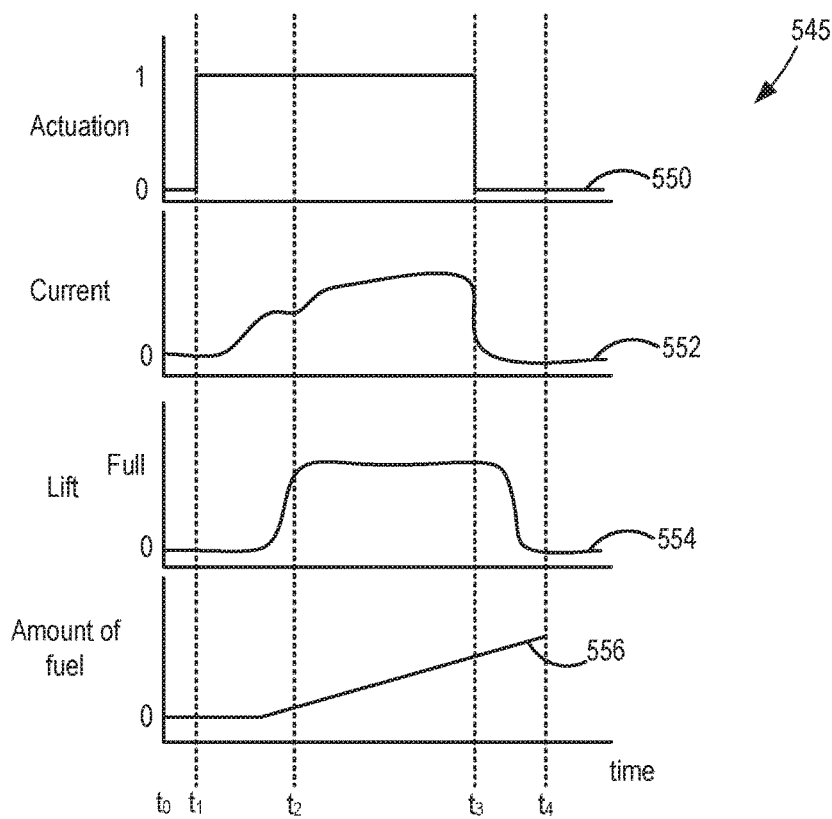

Turning now to FIG. 5B, example illustration 545 graphically depicts a relationship between an actuation pulse (plot 550), current (plot 552), fuel injection valve lift (plot 554) and amount of fuel injected to an engine cylinder (plot 556). At time t0, no actuation voltage is supplied to the fuel injector (plot 550), and thus there is no current supplied either (plot 552). Accordingly, the valve has not yet opened at all (0 lift, plot 554), and no fuel has been injected to a corresponding engine cylinder (plot 556).

At time t1 the fuel injector is actuated (e.g., a voltage is supplied to the fuel injector). However, it takes some time until the valve mechanism reaches full lift. The delay time (e.g., time period between time t1 and t2 may depend on a number of variables including but not limited to actuation voltage, fuel pressure, manifold pressure, temperature, injector spring force, etc. An inflection point in the current at time t2 may be understood to be indicative of when the valve mechanism has reached full lift. Thus, it may be understood that by monitoring current (for example at second circuit location 513 at FIG. 5A), a time-to-open may be inferred. As mentioned above and which will be elaborated in further detail below, time-to-open may be a function of fuel pressure, and thus it may be possible to infer fuel pressure based on the current trace (where fully open corresponds to the inflection point in the current trace, as seen at time t2).

A similar effect may be observed for injector closing as that observed for injector opening. For example, at time t3, voltage is stopped being supplied to the fuel injector. Current decreases accordingly between time t3 and t4, and the valve closes. While in this example illustration 545 current decays faster than the valve becomes fully closed, in other examples current may decay in a fashion that corresponds more closely to valve closing. More specifically, when the valve is no longer actuated at time t3, the induced magnetic field in the coil takes some time to dissipate, thus the valve does not immediately close when the voltage supply is discontinued.

Figure 5C:
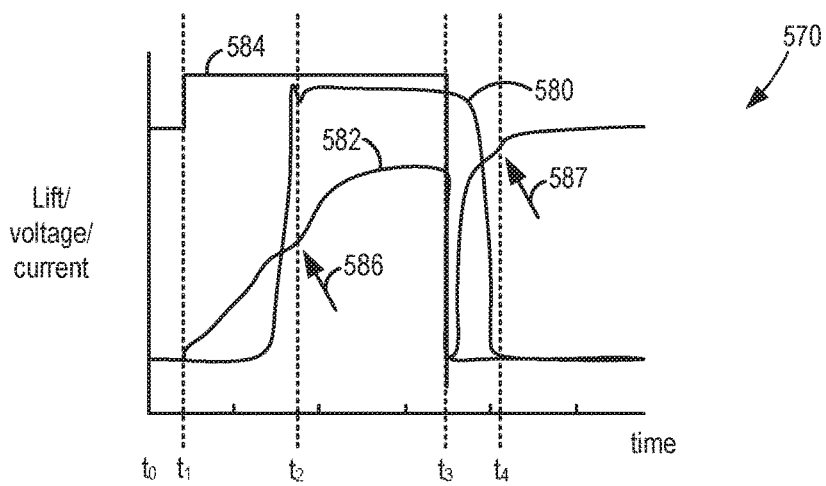

In a case where the fuel injector is energized via the type of circuit depicted at FIG. 5A, it may be understood that a monitored voltage signal (e.g., at first circuit location 512 at FIG. 5A) may be used to infer when the valve is fully closed. Furthermore, as discussed above, a monitored current signal (e.g., at second circuit location 513 at FIG. 5A) may be used infer when the valve is fully open. Turning to FIG. 5C, example illustration 570 graphically depicts how current may be used to infer when the valve is fully open and how voltage may be used to infer when the valve is fully closed. Accordingly, illustration 570 shows a relationship between valve lift (plot 580), current (plot 582) and voltage (plot 584).

At time t0, it may be understood that no voltage (plot 584) is applied to the fuel injector, and accordingly, there is no valve lift (plot 580) as no current (plot 582) is provided to the fuel injector coil. At time t1, a voltage pulse is applied to actuate open the fuel injector. Between time t1 and t2, current increases, and at time t2 an inflection point (refer to arrow 586) in the current trace is indicative of the valve being fully open.

At time t3, the voltage command is discontinued. The voltage trace between time t3 and t4 may be understood to be a result of an extinction voltage of the Zener diode (e.g., Zener diode 510 at FIG. 5A). Specifically, when the low-side switch (e.g., low-side power switch 508 at FIG. 5A) is opened, current through the coil of the injector collapses. However, due to electromagnetic induction there is no step in the current and a negative voltage occurs over the injector. This negative voltage is limited by the Zener voltage. For voltages greater than the Zener voltage a breakdown of the diode occurs. After the end of the breakdown no current flows through the fuel injector anymore. The remaining energy, which is saved in the coil, is dissipated by eddy currents in the metal core. The induced voltage can be observed at the terminals of the coil. Thus, a change in the slope of the voltage at time t4 (refer to arrow 587) is indicative of the fuel injector being fully closed. It may be understood that for injector opening, the inflection point in the current (refer to arrow 586) occurs when the valve mechanism reaches top-dead-center of the fuel injector. The inflection point is a result of the fast change of needle velocity and by that the fast change of inductance of the solenoid. For injector closing, the slope change (refer to arrow 587) again occurs due to the fast change of the inductance of the solenoid.

Figure 5D:
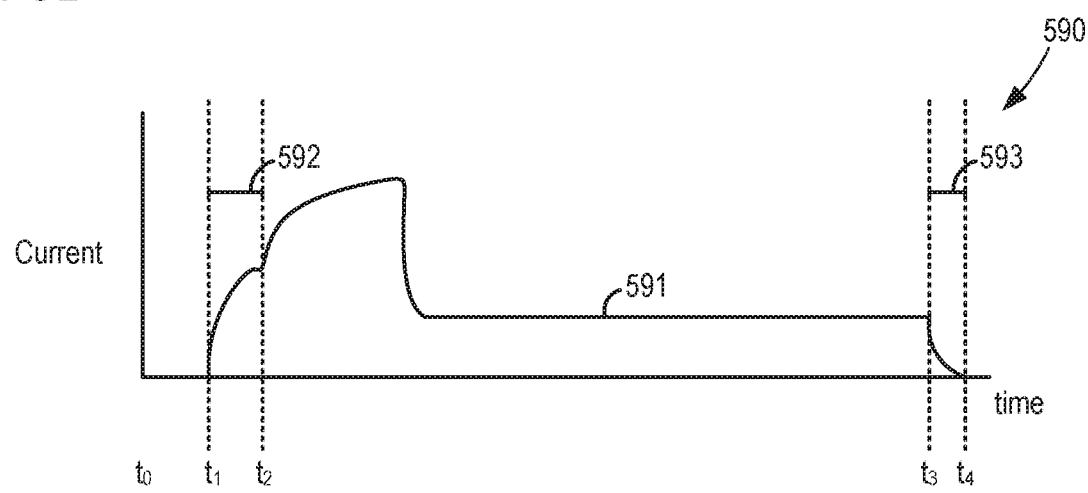

Turning to FIG. 5D, an example illustration 590 is depicted, showing current (plot 591), over time for a peak-and-hold driver (e.g., low impedance or current regulated). Specifically, such a peak-and-hold driver may be used with fuel injectors with low resistance coils that require more current to open. Therefore, a switching mechanism is included in the circuitry that turns down the current to a lower level after the injector is opened. Once the injector is opened, it takes much less current to keep it open. Based on FIG. 5D, it may be understood that the timeframe between time t1 and t2 represents the time to fully open the fuel injector (refer to line 592), and the timeframe between time t3 and t4 represents the time to fully close the injector (refer to line 593). As depicted, peak current occurs between time t2 and t3, before being switched to the lower level between time t2 and t3.

Figure 5E:
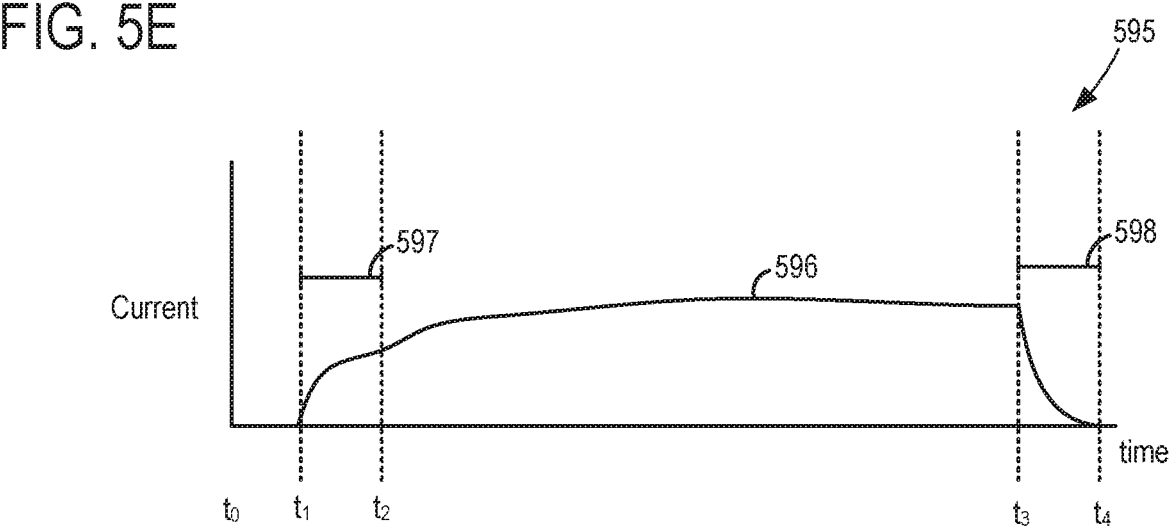

Turning to FIG. 5E, an example illustration 595 is depicted, showing current (plot 596) over time for a saturated driver system (e.g., high impedance). Specifically, an injector used in a saturated driver system may require a high resistance valve across its coil, to enable the injectors to operate at low current levels. Based on FIG. 5E, it may be understood that the timeframe between time t1 and t2 represents the time to fully open the fuel injector (refer to line 597), and the timeframe between time t3 and t4 represents the time to fully close the injector (refer to line 598). As depicted, current saturates between time t2 and t3.

As discussed above, it is herein recognized that the time to fully open a fuel injector and the time to fully close the fuel injector may be impacted by fuel pressure acting on the valve mechanism (e.g., valve mechanism 303 at FIG. 3), and that by using the strategies outlined above (e.g., monitoring an electrical energy profile of a fuel injector in response to injector activation/deactivation), fuel pressure may be inferred based on the inferred time-to-open and time-to-close determinations. Accordingly, turning to FIG. 6A, example illustration 600 graphically depicts time-to-open on the y-axis and fuel pressure on the x-axis (refer to inset 601). As evidenced by plot 605, the time-to-open monotonically increases as fuel pressure increases, and the time-to-open monotonically decreases as fuel pressure decreases. Thus, it is herein recognized that the time-to-open determination may be used to infer fuel pressure.

Turning to FIG. 6B, example illustration 650 graphically depicts time-to-close on the y-axis and fuel pressure on the x-axis (refer to inset 601). As evidenced by plot 655, the time-to-close monotonically decreases as fuel pressure increases (e.g., increased fuel pressure forces closes the valve mechanism faster as compared to lesser fuel pressures), and the time-to-close monotonically increases as fuel pressure decreases (e.g., with less pressure forcing the valve mechanism closed, the valve mechanism closes slower). Thus, it is herein recognized that the time-to-close determination may be used to infer fuel pressure.

In some examples, both the time-to-open and the time-to-close inference may be used in a combined fashion to infer fuel pressure. For example, the time-to-open determination may be used to infer a first fuel pressure, and the time-to-close determination may be used to infer a second fuel pressure. The first fuel pressure and the second fuel pressure may be averaged together to arrive at a determined fuel pressure, for example.

In some examples, any number of time-to-open and/or time-to-close determinations for a particular fuel injector may be used to infer fuel pressure. For example, to obtain higher confidence fuel pressure determinations, a plurality of measurements of time-to-open and/or time-to-close may be obtained, and averaged together to infer fuel pressure.

It may be understood that the determination of fuel pressure may not be limited to one fuel injector open time and/or close time. For example, opening time and/or closing time for a plurality of fuel injector openings and/or closings may in some examples be used in combination to infer fuel pressure, without departing from the scope of this disclosure.

It is herein recognized that variables such as temperature and injector spring force (in addition to fuel pressure) may impact the time-to-open and time-to-close determinations. Thus, it may be understood that in order to infer fuel pressure from time-to-open and/or time-to-close determinations, variables that additionally contribute to opening time and/or closing time may have to be compensated for. Such variables may be accounted for by calibration (e.g., offline calibration) of individual fuel injectors at a plurality of fuel pressures, for example. The calibration may involve actual measurements and/or experimental modeling approaches, for example. By conducting such calibration efforts, one or more lookup tables may be stored at the controller that may enable the controller to infer fuel pressure as a function of time-to-open and/or time-to-close determinations for each individual fuel injector. It may be understood that in some examples, voltage itself may impact the time-to-open/time-to-close of a particular fuel injector. However, it is herein recognized that the impact of voltage may, for example, be avoided by using DI injector drivers for both DIs and PFIs, because the DI injector drivers may eliminate the open/closing dependency on battery voltage.

It is herein additionally recognized that in some examples it may be possible to infer that a particular fuel injector is not functioning as desired or expected (e.g., due to clogging, sticking at least partially open, sticking closed, etc.) based on inferred pressure measurements as a function of opening time and/or closing time. As one example, a particular fuel injector open time may reflect a fuel pressure that is substantially different (e.g., greater than 5% different, or greater than 10% different) than fuel pressure determined by a plurality (e.g., 3) of other fuel injectors. In such an example, it may be inferred that the "correct" fuel pressure is likely the fuel pressure determined via the plurality of fuel injectors, and that the particular fuel injector associated with the different reported fuel pressure is likely degraded to at least some extent (e.g., clogged, sticking open, sticking closed, etc.). As will be discussed in further detail below, such a determination may in some examples be corroborated via a pressure as monitored via a pressure sensor in the fuel rail, or may be based on a pressure relief point.

Turning now to FIG. 7, depicted is a high-level example method 700 for inferring fuel rail pressure based on fuel injector time-to-open and/or time-to-close determinations as inferred from fuel injector electrical energy profiles upon activation/deactivation. Method 700 will be described with reference to the systems described herein and shown in FIGS. 1-3, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the vehicle system, such as the sensors described above with reference to FIGS. 1-2. The controller may employ vehicle system actuators such the fuel pump (e.g., fuel pump 212 at FIG. 2), port fuel injector(s) (e.g., port fuel injectors 170 at FIG. 1), direct fuel injector(s) (e.g., direct fuel injectors 166 at FIG. 1), etc., to alter states of devices in the physical world according to the methods depicted below.

Method 700 begins at 705, and includes indicating whether conditions are met for commanding open a particular fuel injector. With regard to the methodology of FIG. 7, it may be understood that the fuel injector may be a direct fuel injector (e.g., DI 166 at FIG. 1) or a port fuel injector (e.g., PFI 170 at FIG. 1). Conditions being met for commanding the particular fuel injector open may include an indication that the cylinder that receives fuel from the particular fuel injector is in an intake stroke or a compression stroke where fuel is requested to be delivered to the cylinder, for example. If conditions are not met at 705, method 700 proceeds to 710, where current injector status may be maintained. For example, if the injector is already open, then the injector may be maintained in its current status. If the injector is closed, then the injector may be maintained closed. Method 700 may then end.

Returning to 705, responsive to an indication that conditions are met for fuel injector opening, method 700 proceeds to 715. At 715, method 700 includes commanding open the fuel injector. Commanding open the fuel injector may be understood to include supplying a voltage to the fuel injector that results in a current in the coil (e.g., coil 310 at FIG. 3) of the fuel injector. With the fuel injector commanded open at 715, method 700 proceeds to 720. At 720, method 700 includes determining the time-to-open (e.g., time to fully open) the fuel injector based on a monitored electrical energy profile of the fuel injector circuit. Specifically, as discussed above with regard to FIGS. 5A-5E, an inflection point (see for example time t2 at FIG. 5C) in the current trace may be used to infer when the fuel injector is fully open, or in other words, when valve lift is at 100% of its maximum lift ability. Thus, a time between when the valve is initially actuated until when the inflection point in the current trace is indicated may reflect the time-to-open the fuel injector. With the time-to-open determined at 720, method 700 proceeds to 725. At 725, method 700 includes storing the result at the controller.

Proceeding to 730, method 700 includes indicating whether conditions are met for commanding closed the fuel injector. For example, a pulse-width for controlling the fuel injector may be determined prior to initiating the commanding open of the fuel injector, and thus the determined pulse-width may dictate when the fuel injector is to be commanded closed (e.g., deactivated) subsequent to the activation of the fuel injector. If, at 730, conditions are not met for fuel injector closing, then the fuel injector may be maintained open. Alternatively, in response to conditions being met for closing the fuel injector, method 700 proceeds to 740. At 735, method 700 includes commanding closed the fuel injector by removing the voltage supplied to the circuit that controls the fuel injector. In other words, at 735, method 700 includes deactivating the fuel injector such that the fuel injector closes.

In response to deactivation of the fuel injector, method 700 proceeds to 740. At 740, method 700 includes determining the time-to-close based on the electrical energy profile of the injector that occurs as the fuel injector is transitioning from the fully open state to the fully closed state. As one example, the electrical energy profile may relate to voltage as discussed above with regard to FIG. 5C. As another example, the electrical energy profile may relate to current as discussed above with regard to FIGS. 5D-5E.

With the time-to-close determined at 740, method 700 proceeds to 745 where the result is stored at the controller. At 750, method 700 determines whether there is a request for additional data from other fuel injector(s). For example, as mentioned above, there may be circumstances where time-to-open and/or time-to-close determinations are conducted for any number of different fuel injectors, such that the controller may average and/or otherwise compare the inferred time-to-open and/or time-to-close determinations to accurately predict or infer fuel pressure. Thus, if at 750 there is an additional request for data from one or more other fuel injectors, method 700 may return to step 705 where it may be determined as to whether conditions are met for the next fuel injector to be commanded open, and if so, method 700 may again proceed as discussed above.

Returning to 750, responsive to a situation where just one fuel injector time-to-open and/or time-to-close determination is requested, or responsive to a situation where data from a predetermined number of fuel injectors has been acquired, method 700 proceeds to 755. At 755, method 700 includes inferring fuel rail pressure based on the measured time-to-open and/or the measured time-to-close for each injector for which data has been acquired. Specifically, as discussed above with regard to FIGS. 6A-6B, fuel pressure may be inferred based on the time-to-open and/or time-to-close determinations for a particular fuel injector and/or a plurality of fuel injectors. The inferring of fuel pressure may include the controller referencing one or more lookup tables that enable to controller to accurately infer fuel pressure based on the time-to-open and/or time-to-close determinations.

With the fuel pressure determined, method 700 proceeds to 760, where method 700 includes using the inferred fuel rail pressure for pulse-width determinations in order to control the appropriate fuel injector(s) as discussed above with regard to FIG. 4 and/or for correlative diagnostics as will be discussed below with regard to FIG. 8. Method 700 may then end.

Thus, discussed herein, a method may comprise commanding a predetermined amount of a fuel to be injected into a cylinder of an engine via a fuel injector. Responsive to the commanding, the method may include monitoring an electrical energy profile associated with the fuel injector. The method may include inferring a fuel injection pressure based on the electrical energy profile, and controlling a subsequent fuel injection based on the inferred fuel injection pressure.

For such a method, the fuel to be injected into the cylinder of the engine may be contained in a fuel rail, where the fuel rail may not include a pressure sensor for measuring the fuel injection pressure. The fuel rail may be a low pressure fuel rail, and the fuel injector may be a port fuel injector. Alternatively, the fuel rail may be a high pressure fuel rail, and the fuel injector may be a direct fuel injector.

For such a method, the fuel injector may be of an inward-opening configuration of fuel injector.

For such a method, controlling the subsequent fuel injection may include controlling a fuel injection pulse-width of a next-in-line fuel injection based on a firing order of the engine.

For such a method, the method may further comprise determining a time to fully open the fuel injector based on the electrical energy profile, and may include inferring the fuel injection pressure based on the time to fully open the fuel injector.

For such a method, the method may further comprise determining a time to fully close the fuel injector based on the electrical energy profile, and inferring the fuel injection pressure based on the time to fully close the fuel injector.

It may be understood that in some examples, the fuel pressure inferred via the methodology of FIG. 7 may be strictly used to control pulse-width for individual fuel injectors, under conditions where a pressure sensor is not included in the fuel rail that supplies fuel to the particular individual fuel injectors. In other words, it may be possible to avoid reliance on such a fuel rail pressure sensor under conditions where fuel pressure is consistently or regularly determined as a function of injector time-to-open and/or injector time-to-close determinations. In other examples, where the fuel rail does include a pressure sensor, it may be understood that the fuel pressure determinations as discussed with regard to the method of FIG. 7 may be relied upon for controlling fuel injector pulse-width under conditions where it is inferred that the pressure sensor that is used to monitor fuel rail pressure has become degraded.

Turning now to FIG. 8, depicted is a high-level example method 800 for determining whether a pressure sensor (e.g., second fuel rail pressure sensor 258 at FIG. 2) used to monitor pressure in a fuel rail (e.g., second fuel rail 260 at FIG. 2) is functioning as desired, or is inferred to be degraded to some extent. Briefly, the methodology may include inferring fuel rail pressure based on time-to-open and/or time-to-close determinations for one or more fuel injector(s), and then using the inferred fuel rail pressure as a correlative means for inferring whether the pressure sensor is exhibiting degraded function.

Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the vehicle system, such as the sensors described above with reference to FIGS. 1-2. The controller may employ vehicle system actuators such the fuel pump (e.g., fuel pump 212 at FIG. 2), port fuel injector(s) (e.g., port fuel injectors 170 at FIG. 1), direct fuel injector(s) (e.g., direct fuel injectors 166 at FIG. 1), etc., to alter states of devices in the physical world according to the methods depicted below.

Method 800 begins at 805 and includes measuring fuel pressure via the methodology of FIG. 7. With fuel pressure inferred based on the methodology of FIG. 7, method 800 proceeds to 810. At 810, method 800 includes comparing the inferred fuel pressure determined via the methodology of FIG. 7 with a measured fuel pressure via the pressure sensor. The measured fuel pressure may correspond to a single pressure measurement, or may represent an average of a predetermined number of pressure measurements. The comparing may be carried out by the controller, based on instructions stored in non-transitory memory.

At 815, method 800 includes determining whether the inferred fuel pressure differs from the measured fuel pressure by more than a predetermined threshold. The predetermined threshold may represent a difference of 5% or more, 10% or more, 15% or more, 20% or more, etc. For example, if the inferred fuel pressure is greater than the measured fuel pressure by more than 10%, then it may be inferred that the inferred pressure differs from the measured pressure by more than the predetermined threshold.

If, at 815, the inferred fuel pressure is within the predetermined threshold from the measured fuel pressure, method 800 proceeds to 820. At 820, method 800 includes indicating that the pressure sensor for measuring fuel pressure is functioning as desired or expected. The result may be stored at the controller, for example. Proceeding to 825, method 800 includes controlling fuel injector pulse-width (according to, for example the method of FIG. 4) based on output from the pressure sensor. In other words, in a vehicle system that includes a pressure sensor in the fuel rail, the pressure sensor may be relied upon for controlling fuel injector pulse-width as long as the pressure sensor is inferred to be functioning as desired or expected. Method 800 may then end. While method 800 is depicted as ending, it may be understood that method 800 may be periodically (e.g., regularly, at predetermined intervals) carried out. For example, while not explicitly illustrated, it may be understood that method 800 may be initiated after one or more of a predetermined time duration has elapsed since a prior pressure sensor diagnostic was conducted, after a predetermined number of miles driven since a prior pressure sensor diagnostic was conducted, in response to an indication (e.g., engine hesitation or other degraded engine operation) that the pressure sensor may be operating aberrantly, etc.

Returning to 815, in a situation where the controller determines that the inferred fuel pressure differs from the measured fuel pressure by more than the predetermined threshold, method 800 proceeds to 830. At 830, method 800 includes indicating pressure sensor degradation. The result may be stored at the controller, for example. It may be understood that in order to infer pressure sensor degradation (and lack of degradation), the controller may have to be able to conclusively determine that the inferred pressure based on fuel injector time-to-open and/or time-to-close determinations is accurate, and does not reflect, for example, some aspect of degraded fuel injector function. As one example, the controller may determine that the inferred fuel pressure is accurate when a plurality of inferred fuel pressure determinations from different fuel injectors all align. For example, if four different fuel pressure inferences are determined corresponding to four different fuel injectors under circumstances where the fuel pressure is expected to be substantially similar (e.g. less than 5%, less than 2%, less than 1% different), then the controller may determine that the inferred fuel pressures are accurately reflecting fuel pressure. Greater or lesser numbers of inferred pressure measurements may be used without departing from the scope of this disclosure.

Responsive to an indication of pressure sensor degradation, method 800 proceeds to 835. At 835, method 800 includes controlling fuel injector pulse width based on inferred pressure, where as previously discussed the inferred pressure is determined based on time-to-open and/or time-to-close determinations for individual fuel injector(s). In other words, because the pressure sensor is indicated to be degraded, then the methodology of inferring fuel pressure may be relied upon instead for fuel injector pulse-width determinations so as to control fuel injection according to the method of FIG. 4 discussed above.

It may be understood that the methodology discussed with regard to FIG. 8 may be applied to a pressure sensor that monitors pressure in a fuel rail that supplies fuel to PFIs and/or to a different pressure sensor that monitors pressure in a different fuel rail that supplies fuel to DIs. For example, pressure may be inferred via the methodology of FIG. 7 for the fuel rail that supplies fuel to PFIs, such that the pressure sensor that monitors fuel pressure in the fuel rail that supplies fuel to PFIs may be diagnosed according to the method of FIG. 8. In another example, pressure may be inferred via the methodology of FIG. 7 for the fuel rail that supplies fuel to DIs, such that the pressure sensor that monitors fuel pressure in the fuel rail that supplies fuel to DIs may be diagnosed according to the method of FIG. 8.

Thus, discussed herein, a method may comprise commanding a fuel injector to deliver a predetermined amount of a fuel contained in a fuel rail to a cylinder of an engine. The method may further include determining a first duration from when the fuel injector is actuated open to when the fuel injector is fully open and/or determining a second duration from when the fuel injector is actuated closed to when the fuel injector is fully closed. The method may further include indicating a presence or an absence of degradation associated with a pressure sensor that determines a measured fuel injection pressure in the fuel rail based on the first duration and/or the second duration.

For such a method, the method may further comprise determining an inferred fuel injection pressure based on the first duration and/or the second duration, indicating the absence of degradation of the pressure sensor when the inferred fuel injection pressure is within a predetermined threshold of the measured fuel injection pressure, and indicating the presence of degradation of the pressure sensor when the inferred fuel injection pressure is not within the predetermined threshold of the measured fuel injection pressure. In such an example, the method may further include controlling a fuel injection parameter based on the measured fuel injection pressure responsive to an indication of the absence of degradation associated with the pressure sensor, and controlling the fuel injection parameter based on the inferred fuel injection pressure responsive to an indication of the presence of degradation associated with the pressure sensor.

For such a method, the first duration and the second duration may be inferred based on a monitored electrical energy profile associated with the fuel injector responsive to actuating open the fuel injector and actuating closed the fuel injector, respectively.

For such a method, the fuel rail may be a high pressure fuel rail or a low pressure fuel rail, and the fuel injector may be a direct fuel injector or a port fuel injector, respectively.

As mentioned above, with the ability to infer fuel pressure based on time-to-open and/or time-to-close determinations, where the time-to-open and/or time-to-close determinations are based on electrical energy profiles of fuel injector activation/deactivation, it may be possible to avoid reliance on the fuel rail pressure sensor(s) for fuel systems that include pulsed lift pumps (e.g., fuel pump 212 at FIG. 2). In such an example, correlating inferred fuel pressure with a modeled pressure may enable a determination as to whether particular aspects of the overall fuel system are degraded.

Turning to FIG. 9, a high-level example method 900 depicts methodology for correlating inferred fuel pressure measurements with a modeled fuel pressure, to infer a presence/absence of fuel system degradation. Method 900 relates to evaluating port fuel injectors in a single fuel, dual-injector per cylinder, dual fuel rail system. Specifically, the fuel rail pressure in both a high pressure (e.g., first fuel rail 250 at FIG. 2) and a low pressure fuel rail (e.g., second fuel rail 260 at FIG. 2) may be elevated to a predetermined level at which point pumping may be suspended and fuel may be injected into a single cylinder via a PFI in order to detect a pressure drop in the low pressure rail due to the injection. Other cylinders of the engine may continue to be fueled by their respective DIs and the diagnostic may be carried out using one port injector at a time, thereby maintaining engine efficiency. Each port injector may be sequentially diagnosed. It may be understood that the diagnostic routine of FIG. 9 may be performed to diagnose a single cylinder at a time (as shown) or a bank of cylinders at a time.

Method 900 may be carried out by a controller, such as controller 12 in FIG. 1, and may be stored at the controller as executable instructions in non-transitory memory. Instructions for carrying out method 900 and the rest of the methods included herein may be executed by the controller based on instructions stored on a memory of the controller and in conjunction with signals received from sensors of the vehicle system, such as the sensors described above with reference to FIGS. 1-2. The controller may employ vehicle system actuators such the lift pump (e.g., fuel pump 212 at FIG. 2), port fuel injector(s) (e.g., port fuel injectors 170 at FIG. 1), direct fuel injector(s) (e.g., direct fuel injectors 166 at FIG. 1), high pressure fuel pump (e.g., fuel pump 214 at FIG. 2), etc., to alter states of devices in the physical world according to the methods depicted below.

Method 900 begins at 905, and includes indicating whether conditions are met for correlating inferred fuel pressure with modeled fuel pressure. Conditions may be met for such a correlation methodology after one or more of a predetermined number of miles have been driven since the last time the correlation methodology was conducted, after a predetermined time duration has elapsed since the last time the correlation methodology was conducted, in response to an indication that there may be fuel system degradation (e.g., an indication of engine hesitation, stall, engine surge, etc.), etc. If, at 905, conditions are not indicated to be met, method 900 proceeds to 910, where current operating conditions are maintained. For example, a current fuel injection schedule may be maintained without conducting the diagnostic methodology of FIG. 9. Method 900 may then end.

Returning to 905, responsive to conditions being indicated to be met for conducting the diagnostic methodology of FIG. 9, method 900 proceeds to 915. At 915, method 900 includes selecting a particular engine cylinder for fuel injector diagnosis. The particular cylinder and fuel injector pair may be selected according to a predetermined order, or may be selected based on some indication (e.g., misfire) that there may be some issue with fuel injection for the particular cylinder.

With the cylinder and fuel injector pair selected, method 900 proceeds to 920. At 920, method 900 includes operating the lift pump (e.g., pump 212 at FIG. 2) to raise pressure in the low pressure fuel rail (e.g., second fuel rail 260 at FIG. 2) to a first threshold pressure (e.g., maximum pressure, or pressure-relief point). For example, the lift pump may be controlled such that fuel pressure within the low pressure fuel rail is at the first threshold pressure.

Proceeding to 925, the high pressure pump (e.g., HPP 214 at FIG. 2) may be operated to increase pressure within the high pressure fuel rail to a second threshold pressure. As discussed, DIs may operate at higher pressures than PIs. Therefore, the second threshold pressure may be higher than the first threshold pressure. By raising the pressure in the entire fuel system before a calibration event, sufficient fuel may be available for correct metering by the injector and for multiple injection events.

Thus, unlike the lift pump system where fuel is pressurized in the low pressure fuel rail due to a compliance conduit, the high pressure pump system is rigid. This is because the fuel pressure storage in the high pressure system is due to the fuel's bulk modulus. Consequently, by raising the pressure in the high pressure fuel rail sufficiently high (e.g., at a maximum permissible level or above a threshold pressure), the high pressure pump can be transiently turned off even while the direct injectors are supplying fuel to the engine. Since port injector diagnostics require the lift pump to be disabled, and since the lift pump lifts fuel for further pressurization by the high pressure pump, by sufficiently pressurizing the high pressure fuel rail, the high pressure pump and the lift pump can both be disabled during port injector diagnostics without affecting engine fuel delivery via direct injectors.

Proceeding to 930, method 900 includes deactivating the lift pump and the high pressure pump concurrently, or sequentially (e.g., lift pump deactivated first followed by the high pressure pump). Thus, a first fuel volume may exist within the low pressure fuel rail and a second fuel volume may exist within the high pressure fuel rail. After the pumping of fuel is suspended, at 935 method 900 includes injecting fuel via direct injectors to cylinders not selected for injector diagnosis. Alternatively at 940 method 900 includes injecting fuel via the port fuel injector corresponding to the selected cylinder for a predetermined number of injections at a time when conditions are met for providing fuel to the selected cylinder. Conditions being met for providing fuel to the selected cylinder via port fuel injection (and remaining cylinders via direct injection) may be based, for example, on a firing order of the engine.

Proceeding to 945, method 900 includes inferring fuel pressure in the low pressure fuel rail based on the methodology discussed above at FIG. 7 for each injection of fuel to the selected cylinder. In other words, the electrical energy profile(s) discussed above may be relied upon for inferring fuel injector time-to-open and/or time-to-close, whereby the time-to-open and/or time-to-close determinations may in turn be used to infer fuel pressure as discussed. The number of injections to the selected cylinder may be preselected, for example, and may be a function of how many data points are desirable for correlating inferred fuel pressure change with a modeled fuel pressure change.

Proceeding to 950, method 900 includes determining whether the predetermined number of injections have been completed. If not, then method 900 returns to 940, where fuel injection(s) to the selected cylinder continue. Alternatively, responsive to the indication that the predetermined number of injections have been completed, method 900 proceeds to 955. At 955, method 900 includes storing the results of the inferred fuel pressure at each injection at the controller. It may be understood that the inferred fuel pressure at each injection may correspond to a pressure drop, since each injection of fuel may be expected to further lower pressure in the corresponding low pressure fuel rail. Continuing to 960, method 900 includes optionally repeating steps 915-955 for any additional fuel injectors for which diagnosis is requested by the controller. Data points acquired for each fuel injector may similarly be stored at the controller as discussed.

Proceeding to 965, method 900 includes comparing the determined pressure change corresponding to the data points for each individual fuel injector/selected cylinder pair to a modeled pressure change. It may be understood that the modeled pressure change may be an expected pressure change in the fuel rail given the particular fuel injector pulse width, predetermined number of injections, initial fuel rail pressure and other variables including but not limited to temperature of fuel in the fuel rail.

Proceeding to 970, method 900 includes inferring the presence or absence of degradation based on the comparing of the determined pressure change to the modeled pressure change. For example, if the determined pressure change differs by more than a predetermined threshold difference (e.g., greater than 5% different, greater than 10% different, greater than 15% different, greater than 20% different, etc.), then it may be determined that there is degradation. In some examples the degradation may be determined to be due to degradation of a particular fuel injector, as will be discussed above with regard to FIG. 11A. In other examples, the degradation may be determined to be of a different type (e.g., degradation of a pressure relief mechanism (e.g., pressure relief valve 242 at FIG. 2), or other check valve (e.g., valve 244 at FIG. 2) associated with the PFI fuel rail, etc., as will be discussed below with regard to FIG. 11B. Alternatively, if the determined pressure change is within the predetermined threshold difference of the modeled pressure change, then it may be determined that componentry associated with PFI is functioning as desired or expected. Whether the presence or absence of degradation is inferred, the results may be stored at the controller.

Proceeding to 975, method 900 includes updating operating parameters. In a situation where an absence of degradation was indicated at 970, method 900 may include, at 975, updating a schedule for conducting the diagnostic routine of FIG. 9. For example, based on the passing result, another diagnostic routine may be scheduled for a future time (or after a particular number of miles have been driven since the currently conducted diagnostic).

Alternatively, in a situation where the presence of degradation was indicated at 970, method 900 may include, at 975, taking mitigating action responsive to the degradation. As one example, the mitigating action may include commanding the lift pump to drive fuel rail pressure to its known pressure relief point for future fuel injection routines of the PFIs. Additionally or alternatively, the mitigating action may include setting a flag at the controller and/or setting a malfunction indicator at the vehicle dash to alert the vehicle operator of a request to service the vehicle. In a case where it is determined that a particular fuel injector itself is exhibiting degraded functional operation, then in some examples a fuel injection pulse-width for that particular injector may be correspondingly adjusted to compensate for the determined degraded function. In other examples where a particular fuel injector is determined to exhibit degraded function, mitigating action may include avoiding use of the injector where possible, for example via compensating with direct fuel injection. Method 900 may then end.

Turning to FIGS. 10A-10B, depicted at FIG. 10A is an example map 1000 corresponding to the method of FIG. 9 that shows fuel injection timing plotted on the y-axis and cylinder number plotted on the x-axis. The example depicted is for a four-cylinder engine where each cylinder includes a direct injector and a port injector. The top plot 1002 represents a firing sequence for direct injectors and each portion of fuel injection via a direct injector is depicted by a dotted block. The bottom plot 1004 of FIG. 10A represents a firing sequence for port injectors and each portion of port injected fuel is shown as a diagonally striped block. Line 1003 represents the beginning of a port injector calibration sequence corresponding to time t1 of map 1010 of FIG. 10B. Line 1005 represents a timing corresponding to time t2 of map 1010 of FIG. 10B. Plot 1012 illustrates a change in fuel rail pressure within the low pressure fuel rail (e.g., second fuel rail 260 at FIG. 2) as a port injector fires into a single cylinder during calibration. Plot 1014 depicts the change in fuel rail pressure within the high pressure fuel rail (e.g. first fuel rail 250 at FIG. 2) as multiple direct injectors fuel the remaining three cylinders.

Prior to time t1, denoted at FIG. 10A by line 1003, during engine operation when the calibration procedure of FIG. 9 is not being conducted, each cylinder of the engine may be fueled via both PFIs and DIs, and fuel pressure in both rails may be maintained at initial operating pressures. At line 1003, based on conditions being met for conducting the calibration diagnostic of FIG. 9, a port injector calibration sequence may commence for the port injector that provides fuel to cylinder 1. During the calibration event, cylinder 1 may exclusively receive port injected fuel while cylinders 2, 3 and 4 may receive direct injected fuel.

As shown by map 1010 of FIG. 10B, fuel rail pressure may be increased to a threshold level in each of the two fuel rails prior to the start of the calibration event at time t1. Pressure in the low pressure fuel rail coupled to port injectors may be increased from an initial level of PI_Pi to an upper threshold level of PI_Po. Similarly, pressure in the high pressure fuel rail coupled to direct injectors may rise from an initial DI_Pi to a threshold level of DI_Po. The threshold pressure in the high pressure fuel rail, DI_Po is higher than the threshold pressure in the low pressure fuel rail, PI_Po. After both rails are pressurized to their respective upper thresholds, all fuel pumping is suspended until the calibration event for the given port injector is completed (or disabled). For example, the calibration event may be disabled if fuel pressure in the high pressure fuel rail drops below a predetermined minimum pressure threshold. The predetermined minimum pressure threshold may be a fuel pressure at which DI fuel injection becomes compromised. This may occur, for example, because multiple direct fuel injections occur for every port fuel injection during the calibration. Thus, in such a case where pressure in the high pressure fuel rail drops below the predetermined minimum pressure threshold, the calibration diagnostic may be disabled.

After each injection, pressure in each of the fuel rails may experience a drop as shown at FIG. 10B. The pressure may be determined for each injection via the methodology discussed above at FIG. 7. Port injector performance may be evaluated by correlating a pressure drop after each injection to the modeled or expected drop. For example, at time t2, the drop in fuel rail pressure after an injection via the port fuel injector (represented at line 1005 on map 1000) may be calculated as the difference between P1, the pressure before the injection event, and P2, the pressure after that injection event.

As discussed above with regard to the methodology of FIG. 9, in some examples more than one PFI may be diagnosed by simply repeating the methodology of FIG. 9 for each individual PFI/cylinder pair. Turning to FIG. 11A, depicted is an example illustration 1100, showing pressure in the low pressure fuel rail (e.g., second fuel rail 260 at FIG. 2) as a function of time for each PFI of a four-cylinder engine during the diagnostic methodology of FIG. 9 (as illustratively shown at FIGS. 10A-10B). Plot 1105 represents a first PFI corresponding to cylinder 1, plot 1106 represents a second PFI corresponding to cylinder 2, plot 1107 represents a third PFI corresponding to cylinder 3, and plot 1108 represents a fourth PFI corresponding to cylinder 4. Plot 1110 represents the modeled or expected pressure as a function of time for each of the engine cylinders. Line 1112 represents the predetermined threshold which is used to indicate the presence or absence of fuel system degradation.

As illustrated at FIG. 11A, pressure in the low pressure fuel rail steadily drops over time as fuel is injected via the individual PFIs to their respective cylinders. It may be understood that "time" is relative in this example, because the diagnostics for each PFI are not conducted simultaneously, but rather sequentially. Furthermore, the plots may be understood to represent fits to individual measured pressure drops corresponding to each individual PFI.

Each of plots 1105, 1106 and 1107 are shown to be within the predetermined threshold (line 1112) of the modeled or expected pressure drop (plot 1110), while plot 1108 is shown to be outside of the predetermined threshold of the modeled or expected pressure drop. In this example illustration, the pressure drop over time is faster for the fourth PFI (plot 1108), as compared to remaining PFIs that have gone through the diagnostic routine of FIG. 9. Thus, in such an example, the controller may infer that there is degraded functional operation associated with the fourth PFI injector, while remaining PFI injectors are inferred to be functioning as desired or expected. More specifically, due to the fact that the fourth PFI is associated with a faster drop in pressure as compared to remaining PFIs, the controller may infer that the fourth PFI is sticking in an at least partially open position, thereby rendering the PFI open for a greater than expected time period at each fuel injection. While not explicitly shown, in another example where the outlier PFI is determined to have a pressure drop that is slower than expected (and slower than remaining PFIs), then the controller may infer that the outlier PFI may be sticking closed, thereby rendering the PFI closed for a greater than expected time period at each fuel injection.

For example in a situation where both time-to-open and time-to-close determinations are relied upon for inferring fuel pressure, and where the fuel injector is sticking open, then the time-to-open may be as expected, but the time-to-close may be longer (due to the injector sticking open). The longer time-to-close may be inferred as a lower pressure, since in the case of lower pressure the valve may close more slowly. Alternatively, in a case where the fuel injector is sticking closed, then the time-to-open may be longer (due to the valve sticking closed), which may be inferred as a greater pressure, while the time-to-close may be as expected. In the case of a sticking open fuel injector, the controller may thus infer a lower-than-actual pressure by averaging the time-to-open and time-to-close measurements, whereas for a case of a sticking closed fuel injector, the controller may thus infer a greater-than-actual pressure by averaging the time-to-open and time-to-close measurements.

Turning to FIG. 11B, depicted is an example illustration 1150, showing pressure in the low pressure fuel rail (e.g., second fuel rail 260 at FIG. 2) as a function of time for each PFI of a four cylinder engine during the diagnostic methodology of FIG. 9 (as illustratively shown at FIGS. 10A-10B. Plot 1155 represents a first PFI corresponding to cylinder 1, plot 1156 represents a second PFI corresponding to cylinder 2, plot 1157 represents a third PFI corresponding to cylinder 3, and plot 1158 represents a fourth PFI corresponding to cylinder 4. Plot 1160 represents a modeled or expected pressure drop as a function of time for each of the individual injectors. Line 1162 represents the predetermined threshold which is used to indicate the presence or absence of degradation.

As illustrated at FIG. 11B, pressure in the low pressure fuel rail steadily drops over time as fuel is injected via the individual PFIs to their respective cylinders. Similar to that discussed above, "time" is relative in this example because the diagnostics for each PFI are not conducted simultaneously, but rather sequentially. Furthermore, the plots may be understood to represent fits to individual measured pressure drops corresponding to each individual PFI.

None of the plots 1155-1158 are determined to be within the predetermined threshold (line 1162) of the modeled or expected pressure drop (plot 1160). In such an example, it may be unlikely that all of the PFIs are exhibiting degradation, and instead a more general fuel system degradation may be indicated. In other words, there may be an issue with the pressure relief mechanism (e.g., pressure relief valve 242 at FIG. 2), an issue with a check valve (e.g., check valve 244 at FIG. 2), etc.

The maps of FIGS. 10A-10B and corresponding plots of FIGS. 11A-11B relate to the methodology of FIG. 9, where individual PFIs are separately (e.g., sequentially) diagnosed. However, it is herein recognized that in another example there may be opportunity to infer whether there may be fuel system degradation in a more rapid fashion, where if such a rapid diagnosis indicates that there is likely an absence of fuel system degradation, then the diagnostic of FIG. 9 may be avoided until it is inferred that a presence of fuel system degradation is likely or expected. Accordingly, turning to FIG. 12, a high-level example method 1200 depicts an alternative methodology for correlating inferred fuel pressure measurements with a modeled fuel pressure, to infer a presence/absence of fuel system degradation. Similar to the methodology of FIG. 9, method 1200 relates to evaluating port fuel injectors in a single fuel, dual-injector per cylinder, dual fuel rail system. Specifically, the fuel rail pressure in both the high pressure fuel rail (e.g., first fuel rail 250 at FIG. 2) and the low pressure fuel rail (e.g., second fuel rail 260 at FIG. 2) may be elevated to a predetermined level at which point pumping may be suspended and fuel may be injected into each of a plurality of cylinders via PFI in order to detect a pressure drop in the fuel rail supplying fuel to the PFIs. While each cylinder receives fuel from port fuel injection, each cylinder may additionally receive fuel via direct injection. In this way, it may be possible to conduct the diagnostic of FIG. 9 in a manner that reduces an amount of time it takes to arrive at a conclusion of fuel system degradation as compared to that discussed above with regard to FIGS. 9-11B.

Method 1200 may be carried out by a controller, such as controller 12 in FIG. 1, and may be stored at the controller as executable instructions in non-transitory memory. Instructions for carrying out method 1200 and the rest of the methods included herein may be executed by the controller based on instructions stored on a memory of the controller and in conjunction with signals received from sensors of the vehicle system, such as the sensors described above with reference to FIGS. 1-2. The controller may employ vehicle system actuators such the lift pump (e.g., fuel pump 212 at FIG. 2), port fuel injector(s) (e.g., port fuel injectors 170 at FIG. 1), direct fuel injector(s) (e.g., direct fuel injectors 166 at FIG. 1), high pressure fuel pump (e.g., fuel pump 214 at FIG. 2), etc., to alter states of devices in the physical world according to the methods depicted below.

Method 1200 begins at 1205, and includes indicating whether conditions are met for correlating inferred fuel pressure with modeled fuel pressure. Conditions may be met for such a correlation methodology after one or more of a predetermined number of miles have been driven since the last time the correlation methodology was conducted, after a predetermined time duration has elapses since the last time the correlation methodology was conducted, in response to an indication that there may be fuel system degradation (e.g., an indication of engine hesitation, stall, engine surge, etc.), etc. If, at 1205, conditions are not indicated to be met, method 1200 proceeds to 1210, where current operating conditions are maintained. For example, a current fuel injection schedule may be maintained without conducting the diagnostic methodology of FIG. 12. Method 1200 may then end.

Returning to 1205, responsive to conditions being indicated to be met for conducting the diagnostic methodology of FIG. 12, method 1200 proceeds to 1215. At 1215, method 1200 includes operating the lift pump to raise pressure in the low pressure fuel rail to a first threshold pressure (e.g., maximum pressure, or pressure-relief point), and may further include operating the higher pressure pump to increase pressure within the high pressure fuel rail to a second threshold pressure, in similar fashion as that discussed above with regard to steps 920 and 925 at FIG. 9.

Proceeding to 1220, method 1200 includes deactivating the lift pump and the high pressure pump (e.g., concurrently or sequentially), in similar fashion as that discussed above at step 930 of FIG. 9. With the pumps deactivated, the methodology includes injecting fuel via both direct injectors and port fuel injectors to their respective engine cylinder in responsive to conditions being met for doing so (e.g., based on engine firing order). In other words, unlike the methodology of FIG. 9 where one cylinder was selected for port fuel injection while remaining cylinders received direct fuel injection, the methodology of FIG. 12 includes maintaining both port and direct fuel injection to each of the engine cylinders.

Proceeding to 1225, method 1200 includes inferring fuel pressure in the low pressure fuel rail via the methodology of FIG. 7 at each port injection of fuel for each PFI. Specifically, in a situation where firing order is 1, 4, 3, 2, it may be understood that pressure in the low pressure fuel rail may be inferred responsive to fuel injection to cylinder 1, then responsive to fuel injection to cylinder 4, then responsive to fuel injection to cylinder 3, then responsive to fuel injection to cylinder 2, and so on. In other words, the time-to-open and/or time-to-close determinations as inferred by the electrical energy profile as discussed above at FIG. 7 may enable low pressure fuel rail pressure determinations at each port fuel injection.

Proceeding to 1230, method 1200 includes storing the inferred pressure results at the controller. At 1235, method 1200 includes determining whether a predetermined number of total injections have been conducted. It may be desirable to ensure that each cylinder receives the same number of fuel injections, and thus in some examples the predetermined number of total injections may be a multiple of 4 (for a four-cylinder engine). For example, for a four-cylinder engine, the predetermined number of injections may be 8, 12, 16, 20, etc.

If, at 1235, the predetermined number of injections has not been yet met, then method 1200 continues to inject fuel to the cylinders as discussed above. Alternatively, responsive to the predetermined number of injections having been conducted, method 1200 proceeds to 1240. At 1240, method 1200 includes processing the data. Processing the data may in some examples include inferring a slope corresponding to a fit of the pressure drop data for the low pressure fuel rail as a function of time, as will be elaborated in greater detail at FIGS. 14A-14B.

The processed data may be compared to a modeled or expected pressure change at step 1245. Details of such a comparison will be discussed in greater detail at FIGS. 14A-14B. Based on the comparison, a presence or absence of degradation may be determined. At 1255, method 1200 may include updating operating parameters based on the determination of the presence or absence of degradation. For example, similar to that discussed above with regard to FIG. 9, responsive to an absence of degradation, a schedule for conducting the calibration methodology of FIG. 12 may be updated. Alternatively, responsive to an indication of degradation, a flag may be set at the controller and/or a MIL may be illuminated at the vehicle dash so as to alert the vehicle operator of a request to service the vehicle. In some examples where degradation is indicated, the controller may schedule a diagnostic to infer the source of the degradation, which may include scheduling the diagnostic discussed above with regard to FIG. 9. In some examples where fuel system degradation is indicated, the controller may command the powertrain be operated in an electric mode of operation preferentially, where possible, to avoid further use of the degraded fuel system. Method 1200 may then end.

Turning now to FIGS. 13A-13B, depicted at FIG. 13A is an example map 1300 corresponding to the method of FIG. 12 that shows fuel injection timing plotted on the y-axis and cylinder number plotted on the x-axis. Similar to FIG. 10A, the example depicted is for a four-cylinder engine where each cylinder includes a direct injector and a port injector. The top plot 1302 represents a firing sequence for direct injectors and each portion of fuel injection via a direct injector is depicted by a dotted block. The bottom plot 1304 of FIG. 13A represents a firing sequence for port injectors and each portion of port injected fuel is shown as a diagonally striped block. Line 1303 represents the beginning of a port calibration sequence corresponding to time t1 of map 1310 of FIG. 13B. Line 1305 represents a timing corresponding to time t2 of map 1310 of FIG. 13B. Plot 1312 illustrates a change in fuel rail pressure within the low pressure fuel rail (e.g., second fuel rail 260 at FIG. 2) as the port injectors fire into each cylinder during the calibration routine. Plot 1314 depicts the change in fuel rail pressure within the high pressure fuel rail (e.g., first fuel rail 250 at FIG. 2) as fuel is injected to engine cylinders via direct injection during the calibration routine.

Prior to time t1, denoted at FIG. 13A by line 1303, during engine operation when the calibration procedure of FIG. 12 is not being conducted, each cylinder of the engine may be fueled via both PFIs and DIs, and fuel pressure in both fuel rails may be maintained at initial operating pressures (e.g., via controlling operation of the pulsed lift pump 212 at FIG. 2). At line 1303, based on conditions being met for conducting the calibration diagnostic of FIG. 12, a port injector calibration sequence may commence for the port fuel injectors. As opposed to the routine of FIG. 9, the routine of FIG. 12 allows for each engine cylinder to receive fuel via both port injection and direct injection.

As shown by map 1310 of FIG. 13B, fuel rail pressure may be increased to a threshold level in each of the two fuel rails prior to the start of the calibration event at time t1. Pressure in the low pressure fuel rail coupled to port injectors may be increased from an initial level of PI_Pi to an upper threshold level of PI_Po. Similarly, pressure in the high pressure fuel rail coupled to direct injectors may rise from an initial DI_Pi to a threshold level of DI_Po. The threshold pressure in the high pressure fuel rail, DI_Po is higher than the threshold pressure in the low pressure fuel rail, PI_Po. After both rails are pressurized to their respective upper thresholds, all fuel pumping is suspended until the calibration event for the given port injector is completed (or disabled). For example, the calibration event may be disabled if fuel pressure in the high pressure fuel rail drops below a predetermined minimum pressure threshold. The predetermined minimum pressure threshold may be a fuel pressure at which DI fuel injection becomes compromised.

After each injection, pressure in each of the fuel rails may experience a drop as shown at FIG. 13B. The pressure may be determined for each injection via the methodology discussed above at FIG. 7. Port injector performance may be evaluated by correlating a pressure drop after each injection to the modeled or expected drop. For example, at time t2, the drop in fuel rail pressure after an injection via the port fuel injector (represented at line 1005 on map 1000) may be calculated as the difference between P1, the pressure before the injection event, and P2, the pressure after that injection event.

FIGS. 14A-14B illustratively depict the sorts of data that may be obtained via the methodology of FIG. 12. Specifically, FIG. 14A depicts example illustration 1400, showing an example where pressure change in a fuel rail (e.g., low pressure fuel rail 260 at FIG. 2) over time as inferred via time-to-open and/or time-to-close determinations as discussed with regard to FIG. 7, is indicated to correlate with (e.g., be within a predetermined threshold of) a modeled pressure change over time. Accordingly, plot 1403 depicts the inferred pressure drop and plot 1405 depicts the modeled pressure drop. The predetermined threshold is represented by line 1406. As illustrated, pressure is inferred at each fuel injector opening/closing event for each fuel injector based on engine firing order (e.g., 1-4-3-2). A predetermined number of inferred pressure determinations may be obtained as discussed above, which may enable a rapid assessment of whether there may be degradation in the fuel system or not. In the example illustration of FIG. 14A, because the inferred pressure change over time is within the predetermined threshold of the modeled pressure change, it may be understood that the controller may infer an absence of fuel system degradation.

Alternatively, example illustration 1450 at FIG. 14B depicts a situation where the inferred pressure change over time does not correlate with the modeled pressure change. Specifically, plot 1453 depicts inferred pressure change in a fuel rail (e.g., low pressure fuel rail 260 at FIG. 2) over time as inferred via time-to-open and/or time-to-close determinations as discussed with regard to FIG. 7. Plot 1455 depicts modeled pressure change over time. The predetermined threshold is represented by line 1456. In the example illustration 1450, because the inferred pressure change over time is not within the predetermined threshold of the modeled pressure change over time, it may be understood that the controller may infer that there may be a source of fuel system degradation. The degradation may stem from one or more of the fuel injectors themselves (e.g., sticking open or sticking closed), or may relate to another source or type of degradation (e.g., degradation of a pressure relief mechanism, check valve degradation, etc.). Accordingly, in a case where the methodology of FIG. 12 is conducted and the type of data returned is of a nature similar to that depicted at FIG. 14B, then the controller may schedule follow-up tests similar to that discussed above at FIG. 9, in order to gain a better appreciation of the particular type of fuel system degradation that may be occurring, causing the inferred pressure change to not correlate with the modeled pressure change.

In this way, a fuel injection pressure may be determined based on operation of individual fuel injectors. Specifically, information related to time-to-open and time-to-close for individual inward-opening fuel injectors may be inferred based on a monitored electrical energy profile for fuel injector activation/deactivation, and the time-to-open and/or time-to-close determinations may be used to infer fuel injection pressure. Accordingly, as the fuel injectors are relied upon for providing fuel to engine cylinders, fuel injection pressure may continually be updated based on the electrical energy profiles of individual fuel injectors.

The technical effect of inferring fuel injection pressure based on operation of individual fuel injectors is that in some examples reliance on a corresponding fuel rail pressure sensor may be avoided, which may reduce costs and complexity of a vehicle fuel system. For example, a specific technical effect is that it may be possible for a fuel system that includes port fuel injectors and a low pressure fuel rail that receives fuel via a pulsed lift pump to operate without a dedicated fuel rail pressure sensor. In other examples, the technical effect of inferring fuel injection pressure based on operation of individual fuel injectors is that it may be possible to use the inferred fuel injection pressure to determine whether a fuel rail pressure sensor is functioning as desired or expected, or is exhibiting degraded function.

The systems and methods discussed herein may enable one or more systems and one or more methods. In one example, a method comprises commanding a predetermined amount of a fuel to be injected into a cylinder of an engine via a fuel injector; responsive to the commanding, monitoring an electrical energy profile associated with the fuel injector; inferring a fuel injection pressure based on the electrical energy profile; and controlling a subsequent fuel injection based on the inferred fuel injection pressure. In a first example of the method, the method further includes wherein the fuel to be injected into the cylinder of the engine is contained in a fuel rail; and wherein the fuel rail does not include a pressure sensor for measuring the fuel injection pressure. A second example of the method optionally includes the first example, and further includes wherein the fuel rail is a low pressure fuel rail; and wherein the fuel injector is a port fuel injector. A third example of the method optionally includes any one or more or each of the first through second examples, and further includes wherein the fuel rail is a high pressure fuel rail; and wherein the fuel injector is a direct fuel injector. A fourth example of the method optionally includes any one or more or each of the first through third examples, and further includes wherein the fuel injector is of an inward-opening configuration of fuel injector. A fifth example of the method optionally includes any one or more or each of the first through fourth examples, and further includes wherein controlling the subsequent fuel injection includes controlling a fuel injection pulse-width of a next-in-line fuel injection based on a firing order of the engine. A sixth example of the method optionally includes any one or more or each of the first through fifth examples, and further comprises determining a time to fully open the fuel injector based on the electrical energy profile; and inferring the fuel injection pressure based on the time to fully open the fuel injector. A seventh example of the method optionally includes any one or more or each of the first through sixth examples, and further comprises determining a time to fully close the fuel injector based on the electrical energy profile; and inferring the fuel injection pressure based on the time to fully close the fuel injector.

Another example of a method comprises commanding a fuel injector to deliver a predetermined amount of a fuel contained in a fuel rail to a cylinder of an engine; determining a first duration from when the fuel injector is actuated open to when the fuel injector is fully open and/or determining a second duration from when the fuel injector is actuated closed to when the fuel injector is fully closed; and indicating a presence or an absence of degradation associated with a pressure sensor that determines a measured fuel injection pressure in the fuel rail based on the first duration and/or the second duration. In a first example of the method, the method further comprises determining an inferred fuel injection pressure based on the first duration and/or the second duration; indicating the absence of degradation of the pressure sensor when the inferred fuel injection pressure is within a predetermined threshold of the measured fuel injection pressure; and indicating the presence of degradation of the pressure sensor when the inferred fuel injection pressure is not within the predetermined threshold of the measured fuel injection pressure. A second example of the method optionally includes the first example, and further comprises controlling a fuel injection parameter based on the measured fuel injection pressure responsive to an indication of the absence of degradation associated with the pressure sensor; and controlling the fuel injection parameter based on the inferred fuel injection pressure responsive to an indication of the presence of degradation associated with the pressure sensor. A third example of the method optionally includes any one or more or each of the first through second examples, and further includes wherein the first duration and the second duration are inferred based on a monitored electrical energy profile associated with the fuel injector responsive to actuating open the fuel injector and actuating closed the fuel injector, respectively. A fourth example of the method optionally includes any one or more or each of the first through third examples, and further includes wherein the fuel rail is a high pressure fuel rail or a low pressure fuel rail; and wherein the fuel injector is a direct fuel injector or a port fuel injector, respectively.

An example of a system for a vehicle comprises a fuel system that includes a pulse lift pump that supplies a fuel from a fuel tank to a low pressure fuel rail; a set of port fuel injectors that supply fuel from the low pressure fuel rail to a set of cylinders of an engine; and a controller with computer readable instructions stored on non-transitory memory that when executed, cause the controller to: command a predetermined amount of the fuel to be injected into a cylinder of the set of cylinders via a port fuel injector of the set of port fuel injectors; determine a fuel injection pressure of the fuel in the fuel rail based on a time to fully open the port fuel injector and/or a time to fully close the fuel injector; and control a fuel injection pulse width for a subsequent fuel injection to another engine cylinder based on the fuel injection pressure. In a first example of the system, the system further includes wherein the set of port fuel injectors are inward-opening fuel injectors that include a valve mechanism for which an opening rate and a closing rate of the valve mechanism is a function of the fuel injection pressure. A second example of the system optionally includes the first example, and further includes wherein the low pressure fuel rail does not include a pressure sensor. A third example of the system optionally includes any one or more or each of the first through second examples, and further includes wherein the controller stores further instructions to continually update the fuel injection pressure based on the time to fully open each fuel injector and/or the time to fully close each fuel injector as the engine operates in a combusting mode. A fourth example of the system optionally includes any one or more or each of the first through third examples, and further includes wherein the controller stores further instructions to infer the time to fully open the port fuel injector and/or the time to fully close the fuel injector based on a monitored electrical energy profile corresponding to activation and/or deactivation, respectively, of the fuel injector. A fifth example of the system optionally includes any one or more or each of the first through fourth examples, and further includes wherein the fuel rail includes a pressure sensor; and wherein the controller stores further instructions to indicate that the pressure sensor is degraded in response to an indication that the fuel injection pressure differs from a monitored fuel injection pressure as indicated by the pressure sensor by more than a predetermined threshold; and control the fuel injection pulse width for the subsequent fuel injection to another cylinder based on the fuel injection pressure responsive to the pressure sensor being indicated to be degraded. A sixth example of the system optionally includes any one or more or each of the first through fifth examples, and further includes wherein the time to fully open the port fuel injector is independent of a voltage supplied to the port fuel injector.

In another representation, a method comprises inferring a first pressure drop in a fuel rail over a first time corresponding to activation and deactivation of a plurality of fuel injectors that supply a fuel to an engine of a vehicle, the inferred first pressure drop based on time-to-open and/or time-to-close determinations for each of the plurality of fuel injectors, comparing the inferred first pressure drop to a first modeled pressure drop, and indicating a presence of fuel system degradation responsive to the inferred first pressure drop not correlating with the first modeled pressure drop. In one example of the method, the method includes inferring a second pressure drop in the fuel corresponding to activation and deactivation to a single fuel injector selected from the plurality of fuel injectors, comparing the second pressure drop to a second modeled pressure drop, and indicating the fuel system degradation corresponds to the single fuel injector responsive to the second pressure drop not correlating with the second modeled pressure drop. In other words, the method may include conducting the methodology of FIG. 12, and responsive to an indication of fuel system degradation, conducting the methodology of FIG. 9 in order to potentially pinpoint the source of the fuel system degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a fuel system that includes a pulse lift pump that supplies a fuel from a fuel tank to a low pressure fuel rail;
a set of port fuel injectors that supply fuel from the low pressure fuel rail to a set of cylinders of an engine; and
a controller with computer readable instructions stored on non-transitory memory that when executed, cause the controller to:
command a predetermined amount of the fuel to be injected into a cylinder of the set of cylinders via a port fuel injector of the set of port fuel injectors;
determine a fuel injection pressure of the fuel in the fuel rail based on a time to fully open the port fuel injector and/or a time to fully close the fuel injector; and
control a fuel injection pulse width for a subsequent fuel injection to another engine cylinder based on the fuel injection pressure.

2. The system of claim 1, wherein the set of port fuel injectors are inward-opening fuel injectors that include a valve mechanism for which an opening rate and a closing rate of the valve mechanism is a function of the fuel injection pressure.

3. The system of claim 1, wherein the low pressure fuel rail does not include a pressure sensor.

4. The system of claim 1, wherein the controller stores further instructions to continually update the fuel injection pressure based on the time to fully open each fuel injector and/or the time to fully close each fuel injector as the engine operates in a combusting mode.

5. The system of claim 1, wherein the controller stores further instructions to infer the time to fully open the port fuel injector and/or the time to fully close the fuel injector based on a monitored electrical energy profile corresponding to activation and/or deactivation, respectively, of the fuel injector.

6. The system of claim 1, wherein the fuel rail includes a pressure sensor; and
wherein the controller stores further instructions to indicate that the pressure sensor is degraded in response to an indication that the fuel injection pressure differs from a monitored fuel injection pressure as indicated by the pressure sensor by more than a predetermined threshold; and
control the fuel injection pulse width for the subsequent fuel injection to another cylinder based on the fuel injection pressure responsive to the pressure sensor being indicated to be degraded.

7. The system of claim 1, wherein the time to fully open the port fuel injector is independent of a voltage supplied to the port fuel injector.

8. A method comprising:
commanding a predetermined amount of a fuel to be injected into a cylinder of an engine via a fuel injector;
responsive to the commanding, monitoring an electrical energy profile associated with the fuel injector;
inferring a fuel injection pressure based on the electrical energy profile; and
controlling a subsequent fuel injection based on the inferred fuel injection pressure.

9. The method of claim 8, wherein the fuel to be injected into the cylinder of the engine is contained in a fuel rail; and
wherein the fuel rail does not include a pressure sensor for measuring the fuel injection pressure.

10. The method of claim 9, wherein the fuel rail is a low pressure fuel rail; and
wherein the fuel injector is a port fuel injector.

11. The method of claim 9, wherein the fuel rail is a high pressure fuel rail; and
wherein the fuel injector is a direct fuel injector.

12. The method of claim 8, wherein the fuel injector is of an inward-opening configuration of fuel injector.

13. The method of claim 8, wherein controlling the subsequent fuel injection includes controlling a fuel injection pulse-width of a next-in-line fuel injection based on a firing order of the engine.

14. The method of claim 8, further comprising determining a time to fully open the fuel injector based on the electrical energy profile; and
inferring the fuel injection pressure based on the time to fully open the fuel injector.

15. The method of claim 8, further comprising determining a time to fully close the fuel injector based on the electrical energy profile; and inferring the fuel injection pressure based on the time to fully close the fuel injector.

16. A method comprising:

commanding a fuel injector to deliver a predetermined amount of a fuel contained in a fuel rail to a cylinder of an engine;

determining a first duration from when the fuel injector is actuated open to when the fuel injector is fully open and/or determining a second duration from when the fuel injector is actuated closed to when the fuel injector is fully closed; and indicating a presence or an absence of degradation associated with a pressure sensor that determines a measured fuel injection pressure in the fuel rail based on the first duration and/or the second duration.

17. The method of claim 16, further comprising determining an inferred fuel injection pressure based on the first duration and/or the second duration;

indicating the absence of degradation of the pressure sensor when the inferred fuel injection pressure is within a predetermined threshold of the measured fuel injection pressure; and indicating the presence of degradation of the pressure sensor when the inferred fuel injection pressure is not within the predetermined threshold of the measured fuel injection pressure.

18. The method of claim 17, further comprising controlling a fuel injection parameter based on the measured fuel injection pressure responsive to an indication of the absence of degradation associated with the pressure sensor; and controlling the fuel injection parameter based on the inferred fuel injection pressure responsive to an indication of the presence of degradation associated with the pressure sensor.

19. The method of claim 16, wherein the first duration and the second duration are inferred based on a monitored electrical energy profile associated with the fuel injector responsive to actuating open the fuel injector and actuating closed the fuel injector, respectively.

20. The method of claim 16, wherein the fuel rail is a high pressure fuel rail or a low pressure fuel rail; and wherein the fuel injector is a direct fuel injector or a port fuel injector, respectively.

* * * * *